US008095234B2

(12) United States Patent
Polyakov et al.

(10) Patent No.: US 8,095,234 B2
(45) Date of Patent: Jan. 10, 2012

(54) TRANSFERRING DISK DRIVES WITHIN DISK DRIVE TESTING SYSTEMS

(75) Inventors: Evgeny Polyakov, Brookline, MA (US); Edward Garcia, Holbrook, MA (US); Eric L. Truebenbach, Sudbury, MA (US); Brian S. Merrow, Harvard, MA (US); Brian J. Whitaker, Johnstown, CO (US)

(73) Assignee: Teradyne, Inc., North Reading, MA (US)

( * ) Notice: Subject to any disclaimer, the term of this patent is extended or adjusted under 35 U.S.C. 154(b) by 653 days.

(21) Appl. No.: 12/104,536

(22) Filed: Apr. 17, 2008

(65) Prior Publication Data

US 2009/0262444 A1 Oct. 22, 2009

(51) Int. Cl.
*G11B 15/68* (2006.01)
*G11B 17/04* (2006.01)
*G11B 21/08* (2006.01)
*B66C 1/00* (2006.01)
*B66C 3/00* (2006.01)
*G06F 7/00* (2006.01)
*G05B 19/04* (2006.01)
*G05B 19/18* (2006.01)

(52) U.S. Cl. ........ 700/214; 700/213; 700/218; 700/255; 369/30.42; 414/732; 414/273

(58) Field of Classification Search .................. None
See application file for complete search history.

(56) References Cited

U.S. PATENT DOCUMENTS

| 557,186 | A | 3/1896 | Cahill |
| 2,224,407 | A | 12/1940 | Passur |
| 2,380,026 | A | 7/1945 | Clarke |
| 2,631,775 | A | 3/1953 | Gordon |
| 2,635,524 | A | 4/1953 | Jenkins |
| 3,120,166 | A | 2/1964 | Lyman ............................. 98/39 |
| 3,360,032 | A | 12/1967 | Sherwood |
| 3,364,838 | A | 1/1968 | Bradley |
| 3,517,601 | A | 6/1970 | Courchesne |
| 3,845,286 | A | 10/1974 | Aronstein et al. |
| 4,147,299 | A | 4/1979 | Freeman |
| 4,233,644 | A | 11/1980 | Hwang et al. ................. 361/384 |
| 4,336,748 | A | 6/1982 | Martin et al. ..................... 98/33 |
| 4,379,259 | A | 4/1983 | Varadi et al. .................... 324/73 |
| 4,477,127 | A | 10/1984 | Kume ................................ 312/8 |
| 4,495,545 | A | 1/1985 | Dufresne et al. ............. 361/384 |

(Continued)

FOREIGN PATENT DOCUMENTS

AU 583716 5/1989

(Continued)

OTHER PUBLICATIONS

Bakken et al., "Low Cost, Rack Mounted, Direct Access Disk Storage Device", www.ip.com, 4 pages, Mar. 3, 2005.

(Continued)

*Primary Examiner* — Gene Crawford
*Assistant Examiner* — Yolanda Cumbess
(74) *Attorney, Agent, or Firm* — Fish & Richardson P.C.

(57) ABSTRACT

A method of transferring disk drives within a disk drive testing system includes actuating an automated transporter to retrieve multiple disk drives presented for testing, and actuating the automated transporter to deliver each retrieved disk drive to a respective test slot of the disk drive testing system and insert each disk drive in the respective test slot.

17 Claims, 13 Drawing Sheets

U.S. PATENT DOCUMENTS

| | | | | |
|---|---|---|---|---|
| 4,526,318 A | 7/1985 | Fleming et al. | ............... | 236/49 |
| 4,620,248 A | 10/1986 | Gitzendanner | | |
| 4,648,007 A | 3/1987 | Garner | .................. | 361/384 |
| 4,654,732 A | 3/1987 | Mesher | | |
| 4,665,455 A | 5/1987 | Mesher | | |
| 4,683,424 A | 7/1987 | Cutright et al. | | |
| 4,685,303 A | 8/1987 | Branc et al. | .................... | 62/3 |
| 4,688,124 A | 8/1987 | Scribner et al. | | |
| 4,713,714 A | 12/1987 | Gatti et al. | .................. | 360/137 |
| 4,739,444 A | 4/1988 | Zushi et al. | .................. | 361/383 |
| 4,754,397 A | 6/1988 | Varaiya et al. | ............... | 364/200 |
| 4,768,285 A | 9/1988 | Woodman, Jr. | | |
| 4,778,063 A | 10/1988 | Ueberreiter | | |
| 4,801,234 A | 1/1989 | Cedrone | | |
| 4,809,881 A | 3/1989 | Becker | | |
| 4,817,273 A | 4/1989 | Lape et al. | | |
| 4,817,934 A | 4/1989 | McCormick et al. | | |
| 4,851,965 A | 7/1989 | Gabuzda et al. | ............. | 361/383 |
| 4,881,591 A | 11/1989 | Rignall | .................. | 165/26 |
| 4,888,549 A | 12/1989 | Wilson et al. | ............... | 324/73 R |
| 4,911,281 A | 3/1990 | Jenkner | | |
| 4,967,155 A | 10/1990 | Magnuson | .................. | 324/212 |
| 5,012,187 A | 4/1991 | Littlebury | .................... | 324/158 |
| 5,045,960 A | 9/1991 | Eding | | |
| 5,061,630 A | 10/1991 | Knopf et al. | .................. | 435/290 |
| 5,119,270 A | 6/1992 | Bolton et al. | ............... | 361/384 |
| 5,122,914 A | 6/1992 | Hanson | .................... | 360/98.01 |
| 5,127,684 A | 7/1992 | Klotz et al. | .................. | 292/113 |
| 5,128,813 A | 7/1992 | Lee | | |
| 5,136,395 A | 8/1992 | Ishii et al. | | |
| 5,158,132 A | 10/1992 | Guillemot | .................... | 165/30 |
| 5,168,424 A | 12/1992 | Bolton et al. | ............... | 361/384 |
| 5,171,183 A | 12/1992 | Pollard et al. | ............... | 454/184 |
| 5,173,819 A | 12/1992 | Takahashi et al. | .......... | 360/97.03 |
| 5,176,202 A | 1/1993 | Richard | ................. | 165/48.1 |
| 5,205,132 A | 4/1993 | Fu | | |
| 5,206,772 A | 4/1993 | Hirano et al. | | |
| 5,207,613 A | 5/1993 | Ferchau et al. | ............... | 454/184 |
| 5,210,680 A | 5/1993 | Scheibler | ................. | 361/384 |
| 5,237,484 A | 8/1993 | Ferchau et al. | ............... | 361/689 |
| 5,263,537 A | 11/1993 | Plucinski et al. | ................ | 165/97 |
| 5,269,698 A | 12/1993 | Singer | ..................... | 439/157 |
| 5,295,392 A | 3/1994 | Hensel et al. | | |
| 5,309,323 A | 5/1994 | Gray et al. | .................... | 361/726 |
| 5,325,263 A | 6/1994 | Singer et al. | ................. | 361/683 |
| 5,349,486 A | 9/1994 | Sugimoto et al. | .......... | 360/97.01 |
| 5,368,072 A | 11/1994 | Cote | ............................ | 137/872 |
| 5,374,395 A | 12/1994 | Robinson et al. | | |
| 5,379,229 A | 1/1995 | Parsons et al. | | |
| 5,398,058 A | 3/1995 | Hattori | | |
| 5,412,534 A | 5/1995 | Cutts et al. | ................... | 361/695 |
| 5,414,591 A | 5/1995 | Kimura et al. | ............... | 361/695 |
| 5,418,664 A * | 5/1995 | Ostwald | ...................... | 360/92.1 |
| 5,426,581 A | 6/1995 | Kishi et al. | | |
| 5,469,037 A | 11/1995 | McMurtrey, Sr. et al. | ..... | 318/626 |
| 5,477,416 A | 12/1995 | Schkrohowsky et al. | ..... | 361/695 |
| 5,484,012 A | 1/1996 | Hiratsuka | .................... | 165/40 |
| 5,486,681 A | 1/1996 | Dagnac et al. | | |
| 5,491,610 A | 2/1996 | Mok et al. | ................... | 361/685 |
| 5,543,727 A | 8/1996 | Bushard et al. | | |
| 5,546,250 A | 8/1996 | Diel | ............................ | 360/97.02 |
| 5,557,186 A | 9/1996 | McMurtrey, Sr. et al. | ..... | 318/626 |
| 5,563,768 A | 10/1996 | Perdue | ...................... | 361/695 |
| 5,570,740 A | 11/1996 | Flores et al. | | |
| 5,593,380 A | 1/1997 | Bittikofer | | |
| 5,601,141 A | 2/1997 | Gordon et al. | ............... | 165/263 |
| 5,604,662 A | 2/1997 | Anderson et al. | ............. | 361/685 |
| 5,610,893 A | 3/1997 | Soga et al. | ...................... | 369/84 |
| 5,617,430 A | 4/1997 | Angelotti et al. | | |
| 5,644,705 A | 7/1997 | Stanley | ..................... | 395/183.18 |
| 5,646,918 A * | 7/1997 | Dimitri et al. | ................. | 369/30.31 |
| 5,654,846 A | 8/1997 | Wicks et al. | .................. | 360/97.01 |
| 5,673,029 A | 9/1997 | Behl et al. | .................... | 340/635 |
| 5,694,290 A | 12/1997 | Chang | ........................ | 361/685 |
| 5,718,627 A | 2/1998 | Wicks | .......................... | 454/68 |
| 5,718,628 A | 2/1998 | Nakazato et al. | ............. | 454/184 |
| 5,731,928 A | 3/1998 | Jabbari et al. | | |
| 5,751,549 A | 5/1998 | Eberhardt et al. | ............ | 361/687 |
| 5,754,365 A | 5/1998 | Beck et al. | | |
| 5,761,032 A | 6/1998 | Jones | ............................ | 361/685 |
| 5,793,610 A | 8/1998 | Schmitt et al. | ............... | 361/695 |
| 5,811,678 A | 9/1998 | Hirano | .......................... | 73/461 |
| 5,812,761 A | 9/1998 | Seki et al. | ................. | 395/185.07 |
| 5,819,842 A | 10/1998 | Potter et al. | .................. | 165/206 |
| 5,831,525 A | 11/1998 | Harvey | ....................... | 340/507 |
| 5,851,143 A | 12/1998 | Hamid | .......................... | 454/57 |
| 5,859,409 A | 1/1999 | Kim et al. | ..................... | 219/400 |
| 5,859,540 A | 1/1999 | Fukumoto | .................... | 324/760 |
| 5,862,037 A | 1/1999 | Behl | ............................ | 361/687 |
| 5,870,630 A | 2/1999 | Reasoner et al. | ............. | 395/894 |
| 5,886,639 A | 3/1999 | Behl et al. | .................... | 340/635 |
| 5,890,959 A | 4/1999 | Pettit et al. | ................... | 454/184 |
| 5,912,799 A | 6/1999 | Grouell et al. | ................ | 361/685 |
| 5,913,926 A | 6/1999 | Anderson et al. | ............. | 714/6 |
| 5,914,856 A | 6/1999 | Morton et al. | ................ | 361/690 |
| 5,927,386 A | 7/1999 | Lin | ............................... | 165/80.3 |
| 5,956,301 A | 9/1999 | Dimitri et al. | | |
| 5,959,834 A | 9/1999 | Chang | ........................ | 361/685 |
| 5,999,356 A | 12/1999 | Dimitri et al. | .................. | 360/71 |
| 5,999,365 A | 12/1999 | Hasegawa et al. | ......... | 360/97.02 |
| 6,000,623 A | 12/1999 | Blatti et al. | .................. | 236/49.3 |
| 6,005,404 A | 12/1999 | Cochran et al. | ............... | 324/760 |
| 6,005,770 A | 12/1999 | Schmitt | ....................... | 361/695 |
| 6,008,636 A | 12/1999 | Miller et al. | | |
| 6,008,984 A | 12/1999 | Cunningham et al. | ........ | 361/685 |
| 6,011,689 A | 1/2000 | Wrycraft | ....................... | 361/695 |
| 6,031,717 A | 2/2000 | Baddour et al. | ............... | 361/687 |
| 6,034,870 A | 3/2000 | Osborn et al. | ................ | 361/690 |
| 6,042,348 A | 3/2000 | Aakalu et al. | ................ | 417/423.5 |
| 6,045,113 A | 4/2000 | Itakura | | |
| 6,055,814 A | 5/2000 | Song | | |
| 6,066,822 A | 5/2000 | Nemoto et al. | | |
| 6,067,225 A | 5/2000 | Reznikov et al. | ............. | 361/685 |
| 6,069,792 A | 5/2000 | Nelik | ............................ | 361/687 |
| 6,084,768 A | 7/2000 | Bolognia | ...................... | 361/685 |
| 6,094,342 A | 7/2000 | Dague et al. | .................. | 361/685 |
| 6,104,607 A | 8/2000 | Behl | ............................ | 361/687 |
| 6,115,250 A | 9/2000 | Schmitt | ....................... | 361/695 |
| 6,122,131 A | 9/2000 | Jeppson | | |
| 6,122,232 A | 9/2000 | Schell et al. | | |
| 6,124,707 A | 9/2000 | Kim et al. | ................... | 324/158.1 |
| 6,130,817 A | 10/2000 | Flotho et al. | .................. | 361/685 |
| 6,144,553 A | 11/2000 | Hileman et al. | ............... | 361/687 |
| 6,166,901 A | 12/2000 | Gamble et al. | ................ | 361/685 |
| 6,169,413 B1 | 1/2001 | Paek et al. | ..................... | 324/760 |
| 6,169,930 B1 | 1/2001 | Blachek et al. | | |
| 6,177,805 B1 | 1/2001 | Pih | ............................... | 324/754 |
| 6,178,835 B1 | 1/2001 | Orriss et al. | .................. | 73/865.9 |
| 6,181,557 B1 | 1/2001 | Gatti | ............................ | 361/695 |
| 6,185,065 B1 | 2/2001 | Hasegawa et al. | ......... | 360/97.02 |
| 6,185,097 B1 | 2/2001 | Behl | ............................ | 361/695 |
| 6,188,191 B1 | 2/2001 | Frees et al. | | |
| 6,192,282 B1 | 2/2001 | Smith et al. | | |
| 6,193,339 B1 | 2/2001 | Behl et al. | .................... | 312/223.2 |
| 6,209,842 B1 | 4/2001 | Anderson et al. | ............. | 248/560 |
| 6,227,516 B1 | 5/2001 | Webster, Jr. et al. | .......... | 248/694 |
| 6,229,275 B1 | 5/2001 | Yamamoto | | |
| 6,231,145 B1 | 5/2001 | Liu | ............................... | 312/332.1 |
| 6,233,148 B1 | 5/2001 | Shen | | |
| 6,236,563 B1 | 5/2001 | Buican et al. | ................. | 361/685 |
| 6,247,944 B1 | 6/2001 | Bolognia et al. | ............. | 439/157 |
| 6,249,824 B1 | 6/2001 | Henrichs | | |
| 6,252,769 B1 | 6/2001 | Tullstedt et al. | ............... | 361/694 |
| 6,262,863 B1 | 7/2001 | Ostwald et al. | | |
| 6,272,007 B1 | 8/2001 | Kitlas et al. | | |
| 6,272,767 B1 | 8/2001 | Botruff et al. | | |
| 6,281,677 B1 | 8/2001 | Cosci et al. | ................... | 324/212 |
| 6,282,501 B1 | 8/2001 | Assouad | ...................... | 702/117 |
| 6,285,524 B1 | 9/2001 | Boigenzahn et al. | | |
| 6,289,678 B1 | 9/2001 | Pandolfi | ....................... | 62/3.2 |
| 6,297,950 B1 | 10/2001 | Erwin | .......................... | 361/685 |
| 6,298,672 B1 | 10/2001 | Valicoff, Jr. | | |
| 6,302,714 B1 | 10/2001 | Bolognia et al. | ............. | 439/157 |
| 6,304,839 B1 | 10/2001 | Ho et al. | ....................... | 703/18 |
| 6,307,386 B1 | 10/2001 | Fowler et al. | | |
| 6,327,150 B1 | 12/2001 | Levy et al. | .................... | 361/724 |
| 6,330,154 B1 | 12/2001 | Fryers et al. | .................. | 361/695 |

| Patent No. | Date | Inventor | Class |
|---|---|---|---|
| 6,351,379 B1 | 2/2002 | Cheng | 361/685 |
| 6,354,792 B1 | 3/2002 | Kobayashi et al. | |
| 6,356,409 B1 | 3/2002 | Price et al. | 360/98.07 |
| 6,356,415 B1 | 3/2002 | Kabasawa | 360/256.3 |
| 6,384,995 B1 | 5/2002 | Smith | 360/31 |
| 6,388,437 B1 | 5/2002 | Wolski et al. | |
| 6,388,875 B1 | 5/2002 | Chen | 361/685 |
| 6,388,878 B1 | 5/2002 | Chang | 361/687 |
| 6,389,225 B1 | 5/2002 | Malinoski et al. | 392/479 |
| 6,411,584 B2 | 6/2002 | Davis et al. | |
| 6,421,236 B1 | 7/2002 | Montoya et al. | 361/685 |
| 6,434,000 B1 | 8/2002 | Pandolfi | 361/685 |
| 6,434,498 B1 | 8/2002 | Ulrich et al. | 702/115 |
| 6,434,499 B1 | 8/2002 | Ulrich et al. | 702/115 |
| 6,464,080 B1 | 10/2002 | Morris et al. | 306/591 |
| 6,467,153 B2 | 10/2002 | Butts et al. | 29/603.03 |
| 6,473,297 B1 | 10/2002 | Behl et al. | 361/685 |
| 6,473,301 B1 | 10/2002 | Levy et al. | 361/685 |
| 6,476,627 B1 | 11/2002 | Pelissier et al. | 324/760 |
| 6,477,044 B2 | 11/2002 | Foley et al. | |
| 6,477,442 B1 | 11/2002 | Valerino, Sr. | |
| 6,480,380 B1 | 11/2002 | French et al. | 361/690 |
| 6,480,382 B2 | 11/2002 | Cheng | 361/695 |
| 6,487,071 B1 | 11/2002 | Tata et al. | 361/685 |
| 6,489,793 B2 | 12/2002 | Jones et al. | 324/760 |
| 6,494,663 B2 | 12/2002 | Ostwald et al. | |
| 6,525,933 B2 | 2/2003 | Eland | 361/686 |
| 6,526,841 B1 | 3/2003 | Wanek et al. | 73/865.6 |
| 6,535,384 B2 | 3/2003 | Huang | 361/695 |
| 6,537,013 B2 | 3/2003 | Emberty et al. | |
| 6,544,309 B1 | 4/2003 | Hoefer et al. | 55/283 |
| 6,546,445 B1 | 4/2003 | Hayes | 710/305 |
| 6,553,532 B1 | 4/2003 | Aoki | |
| 6,560,107 B1 | 5/2003 | Beck et al. | |
| 6,565,163 B2 | 5/2003 | Behl et al. | 312/223.1 |
| 6,566,859 B2 | 5/2003 | Wolski et al. | 324/158.1 |
| 6,567,266 B2 | 5/2003 | Ives et al. | |
| 6,570,734 B2 | 5/2003 | Ostwald et al. | |
| 6,577,586 B1 | 6/2003 | Yang et al. | |
| 6,577,687 B2 | 6/2003 | Hall et al. | |
| 6,618,254 B2 | 9/2003 | Ives | |
| 6,626,846 B2 | 9/2003 | Spencer | |
| 6,628,518 B2 | 9/2003 | Behl et al. | 361/687 |
| 6,635,115 B1 | 10/2003 | Fairbairn et al. | |
| 6,640,235 B1 | 10/2003 | Anderson | 708/100 |
| 6,644,982 B1 | 11/2003 | Ondricek et al. | |
| 6,651,192 B1 | 11/2003 | Viglione et al. | 714/47 |
| 6,654,240 B1 | 11/2003 | Tseng et al. | 361/685 |
| 6,679,128 B2 | 1/2004 | Wanek et al. | 73/865.6 |
| 6,693,757 B2 | 2/2004 | Hayakawa et al. | 360/69 |
| 6,741,529 B1 | 5/2004 | Getreuer | |
| 6,746,648 B1 | 6/2004 | Mattila et al. | |
| 6,751,093 B1 | 6/2004 | Hsu et al. | 361/685 |
| 6,791,785 B1 | 9/2004 | Messenger et al. | |
| 6,791,799 B2 | 9/2004 | Fletcher | 360/255 |
| 6,798,651 B2 | 9/2004 | Syring et al. | 361/685 |
| 6,798,972 B1 | 9/2004 | Ito et al. | |
| 6,801,834 B1 | 10/2004 | Konshak et al. | |
| 6,806,700 B2 | 10/2004 | Wanek et al. | 324/158.1 |
| 6,811,427 B2 | 11/2004 | Garrett et al. | 439/378 |
| 6,826,046 B1 | 11/2004 | Muncaster et al. | 361/687 |
| 6,830,372 B2 | 12/2004 | Liu et al. | 374/57 |
| 6,832,929 B2 | 12/2004 | Garrett et al. | 439/378 |
| 6,861,861 B2 | 3/2005 | Song et al. | |
| 6,862,173 B1 | 3/2005 | Konshak et al. | |
| 6,867,939 B2 | 3/2005 | Katahara et al. | 360/53 |
| 6,892,328 B2 | 5/2005 | Klein et al. | 714/42 |
| 6,904,479 B2 | 6/2005 | Hall et al. | |
| 6,908,330 B2 | 6/2005 | Garrett et al. | 439/378 |
| 6,928,336 B2 | 8/2005 | Peshkin et al. | |
| 6,937,432 B2 | 8/2005 | Sri-Jayantha et al. | 360/97.01 |
| 6,957,291 B2 | 10/2005 | Moon et al. | |
| 6,965,811 B2 | 11/2005 | Dickey et al. | |
| 6,974,017 B2 | 12/2005 | Oseguera | |
| 6,976,190 B1 | 12/2005 | Goldstone | 714/42 |
| 6,980,381 B2 | 12/2005 | Gray et al. | 360/31 |
| 6,982,872 B2 | 1/2006 | Behl et al. | 361/687 |
| 7,006,325 B2 | 2/2006 | Emberty et al. | |
| 7,039,924 B2 | 5/2006 | Goodman et al. | |
| 7,054,150 B2 * | 5/2006 | Orriss et al. | 361/679.33 |
| 7,070,323 B2 | 7/2006 | Wanek et al. | 374/45 |
| 7,076,391 B1 | 7/2006 | Pakzad et al. | 702/118 |
| 7,077,614 B1 | 7/2006 | Hasper et al. | |
| 7,088,541 B2 | 8/2006 | Orriss et al. | 360/71 |
| 7,092,251 B1 | 8/2006 | Henry | 361/685 |
| 7,106,582 B2 | 9/2006 | Albrecht et al. | 361/685 |
| 7,123,477 B2 | 10/2006 | Coglitore et al. | |
| 7,126,777 B2 | 10/2006 | Flechsig et al. | 360/59 |
| 7,130,138 B2 | 10/2006 | Lum et al. | 360/31 |
| 7,134,553 B2 | 11/2006 | Stephens | |
| 7,139,145 B1 | 11/2006 | Archibald et al. | 360/53 |
| 7,164,579 B2 | 1/2007 | Muncaster et al. | 361/685 |
| 7,167,360 B2 | 1/2007 | Inoue et al. | |
| 7,181,458 B1 | 2/2007 | Higashi | |
| 7,203,021 B1 | 4/2007 | Ryan et al. | |
| 7,203,060 B2 | 4/2007 | Kay et al. | 361/685 |
| 7,206,201 B2 | 4/2007 | Behl et al. | |
| 7,216,968 B2 | 5/2007 | Smith et al. | |
| 7,219,028 B2 | 5/2007 | Bae et al. | |
| 7,219,273 B2 | 5/2007 | Fisher et al. | |
| 7,227,746 B2 | 6/2007 | Tanaka et al. | 361/685 |
| 7,232,101 B2 | 6/2007 | Wanek et al. | 248/346.06 |
| 7,243,043 B2 | 7/2007 | Shin | |
| 7,248,467 B2 | 7/2007 | Sri-Jayantha et al. | 361/685 |
| 7,259,966 B2 | 8/2007 | Connelly, Jr. et al. | 361/727 |
| 7,273,344 B2 | 9/2007 | Ostwald et al. | |
| 7,280,353 B2 | 10/2007 | Wendel et al. | |
| 7,289,885 B2 | 10/2007 | Basham et al. | |
| 7,304,855 B2 | 12/2007 | Milligan et al. | 361/724 |
| 7,315,447 B2 | 1/2008 | Inoue et al. | |
| 7,349,205 B2 | 3/2008 | Hall et al. | |
| 7,353,524 B1 | 4/2008 | Lin et al. | |
| 7,385,385 B2 | 6/2008 | Magliocco et al. | |
| 7,395,133 B2 | 7/2008 | Lowe | |
| 7,403,451 B2 | 7/2008 | Goodman et al. | |
| 7,437,212 B2 | 10/2008 | Farchmin et al. | |
| 7,447,011 B2 | 11/2008 | Wade et al. | |
| 7,457,112 B2 | 11/2008 | Fukuda et al. | |
| 7,467,024 B2 | 12/2008 | Flitsch | |
| 7,476,362 B2 | 1/2009 | Angros | 422/100 |
| 7,483,269 B1 | 1/2009 | Marvin, Jr. et al. | |
| 7,505,264 B2 | 3/2009 | Hall et al. | |
| 7,554,811 B2 | 6/2009 | Scicluna et al. | |
| 7,568,122 B2 | 7/2009 | Mechalke et al. | |
| 7,570,455 B2 | 8/2009 | Deguchi et al. | |
| 7,573,715 B2 | 8/2009 | Mojaver et al. | |
| 7,584,851 B2 | 9/2009 | Hong et al. | |
| 7,612,996 B2 | 11/2009 | Atkins et al. | |
| 7,625,027 B2 | 12/2009 | Kiaie et al. | |
| 7,630,196 B2 | 12/2009 | Hall et al. | |
| 7,643,289 B2 | 1/2010 | Ye et al. | |
| 7,646,596 B2 | 1/2010 | Ng | |
| 2001/0006453 A1 | 7/2001 | Glorioso et al. | 361/685 |
| 2001/0044023 A1 | 11/2001 | Johnson et al. | |
| 2001/0046118 A1 | 11/2001 | Yamanashi et al. | 361/687 |
| 2001/0048590 A1 | 12/2001 | Behl et al. | |
| 2002/0030981 A1 | 3/2002 | Sullivan et al. | |
| 2002/0044416 A1 | 4/2002 | Harmon, III et al. | 361/685 |
| 2002/0051338 A1 | 5/2002 | Jiang et al. | |
| 2002/0071248 A1 | 6/2002 | Huang et al. | 361/685 |
| 2002/0079422 A1 | 6/2002 | Jiang | |
| 2002/0090320 A1 | 7/2002 | Burow et al. | |
| 2002/0116087 A1 | 8/2002 | Brown | |
| 2002/0161971 A1 | 10/2002 | Dimitri et al. | 711/114 |
| 2002/0172004 A1 | 11/2002 | Ives et al. | 361/685 |
| 2003/0035271 A1 | 2/2003 | Lelong et al. | 361/724 |
| 2003/0043550 A1 | 3/2003 | Ives | 361/726 |
| 2003/0206397 A1 | 11/2003 | Allgeyer et al. | 361/685 |
| 2004/0165489 A1* | 8/2004 | Goodman et al. | 369/30.42 |
| 2004/0230399 A1 | 11/2004 | Shin | 702/182 |
| 2004/0236465 A1 | 11/2004 | Butka et al. | |
| 2004/0264121 A1 | 12/2004 | Orriss et al. | 361/685 |
| 2005/0004703 A1* | 1/2005 | Christie, Jr. | 700/214 |
| 2005/0010836 A1 | 1/2005 | Bae et al. | 714/25 |
| 2005/0018397 A1 | 1/2005 | Kay et al. | 361/685 |
| 2005/0055601 A1 | 3/2005 | Wilson et al. | |
| 2005/0057849 A1 | 3/2005 | Twogood et al. | |
| 2005/0069400 A1 | 3/2005 | Dickey et al. | |

| | | | | | | |
|---|---|---|---|---|---|---|
| 2005/0109131 A1 | 5/2005 | Wanek et al. ............... 73/865.9 | EP | 0242970 | 10/1987 | |
| 2005/0116702 A1 | 6/2005 | Wanek et al. ............... 324/158.1 | EP | 0 277 634 | 8/1988 | |
| 2005/0131578 A1 | 6/2005 | Weaver | EP | 0 277 634 A | 8/1988 | |
| 2005/0179457 A1 | 8/2005 | Min et al. | EP | 0356977 | 8/1989 | |
| 2005/0207059 A1 | 9/2005 | Cochrane | EP | 0442642 | 2/1991 | |
| 2005/0219809 A1 | 10/2005 | Muncaster et al. ........... 361/685 | EP | 0466073 | 7/1991 | |
| 2005/0225338 A1 | 10/2005 | Sands et al. ................. 324/754 | EP | 0776009 | 11/1991 | |
| 2005/0270737 A1 | 12/2005 | Wilson et al. ................ 361/685 | EP | 0582017 | 2/1994 | |
| 2006/0023331 A1 | 2/2006 | Flechsig et al. | EP | 0617570 | 9/1994 | |
| 2006/0028802 A1 | 2/2006 | Shaw et al. .................... 361/728 | EP | 0635836 | 1/1995 | |
| 2006/0066974 A1 | 3/2006 | Akamatsu et al. | EP | 741508 | 11/1996 | |
| 2006/0130316 A1 | 6/2006 | Takase et al. ................ 29/603.09 | EP | 0757320 | 2/1997 | |
| 2006/0190205 A1 | 8/2006 | Klein et al. | EP | 0757351 | 2/1997 | |
| 2006/0227517 A1 | 10/2006 | Zayas et al. .................... 361/748 | EP | 0840476 | 5/1998 | |
| 2006/0250766 A1 | 11/2006 | Blaalid et al. ................. 361/685 | EP | 1 045 301 | 10/2000 | |
| 2006/0269384 A1 | 11/2006 | Kiaie et al. ................ 414/222.02 | EP | 1 045 301 A | 10/2000 | |
| 2007/0034368 A1 | 2/2007 | Atkins et al. .................. 165/247 | EP | 1209557 | 5/2002 | |
| 2007/0035874 A1 | 2/2007 | Wendel et al. | EP | 1 422 713 | 5/2004 | |
| 2007/0035875 A1 | 2/2007 | Hall et al. | EP | 1422713 | 5/2004 | |
| 2007/0053154 A1 | 3/2007 | Fukuda et al. | EP | 1234308 | 5/2006 | |
| 2007/0082907 A1 | 4/2007 | Canada et al. | EP | 1 760 722 | 3/2007 | |
| 2007/0127202 A1 | 6/2007 | Scicluna et al. .............. 361/685 | EP | 1760722 | 3/2007 | |
| 2007/0127206 A1 | 6/2007 | Wade et al. ................... 361/687 | EP | 1612798 | 11/2007 | |
| 2007/0195497 A1 | 8/2007 | Atkins ............................ 361/685 | GB | 2241118 | 8/1991 | |
| 2007/0248142 A1 | 10/2007 | Rountree et al. | GB | 2276275 | 9/1994 | |
| 2007/0253157 A1 | 11/2007 | Atkins et al. ................. 361/685 | GB | 2299436 | 10/1996 | |
| 2007/0286045 A1 | 12/2007 | Onagi et al. | GB | 2 312 984 | 11/1997 | |
| 2008/0007865 A1 | 1/2008 | Orriss et al. ................. 360/97.01 | GB | 2312984 | 11/1997 | |
| 2008/0030945 A1 | 2/2008 | Mojaver et al. | GB | 2328782 | 3/1999 | |
| 2008/0112075 A1 | 5/2008 | Farquhar et al. ............. 360/97.02 | GB | 2439844 | 7/2008 | |
| 2008/0239564 A1 | 10/2008 | Farquhar et al. ............. 360/97.02 | JP | 61-115279 | 6/1986 | |
| 2008/0282275 A1 | 11/2008 | Zaczek et al. | JP | 62-177621 | 8/1987 | |
| 2008/0282278 A1 | 11/2008 | Barkley | JP | 62-239394 | 10/1987 | |
| 2009/0028669 A1 | 1/2009 | Rebstock | JP | 62-251915 | 11/1987 | |
| 2009/0082907 A1 | 3/2009 | Stuvel et al. | JP | 63-002160 | 1/1988 | |
| 2009/0122443 A1 | 5/2009 | Farquhar et al. | JP | 63-004483 | 1/1988 | |
| 2009/0142169 A1 | 6/2009 | Garcia et al. | JP | 63-016482 | 1/1988 | |
| 2009/0153992 A1 | 6/2009 | Garcia et al. | JP | 63-062057 | 3/1988 | |
| 2009/0153993 A1 | 6/2009 | Garcia et al. | JP | 63-201946 | 8/1988 | |
| 2009/0153994 A1 | 6/2009 | Merrow | JP | 63-214972 | 9/1988 | |
| 2009/0175705 A1 | 7/2009 | Nakao et al. | JP | 63-269376 | 11/1988 | |
| 2009/0261047 A1 | 10/2009 | Merrow | JP | 63-195697 | 12/1988 | |
| 2009/0261228 A1 | 10/2009 | Merrow | JP | 64-089034 | 4/1989 | |
| 2009/0261229 A1 | 10/2009 | Merrow | JP | 2-091565 | 3/1990 | |
| 2009/0262444 A1 | 10/2009 | Polyakov et al. | JP | 2-098197 | 4/1990 | |
| 2009/0262445 A1 | 10/2009 | Noble et al. | JP | 2-185784 | 7/1990 | |
| 2009/0262454 A1 | 10/2009 | Merrow | JP | 2-199690 | 8/1990 | |
| 2009/0262455 A1 | 10/2009 | Merrow | JP | 2-278375 | 11/1990 | |
| 2009/0265032 A1 | 10/2009 | Toscano et al. | JP | 2-297770 | 12/1990 | |
| 2009/0265043 A1 | 10/2009 | Merrow et al. | JP | 3-008086 | 1/1991 | |
| 2009/0265136 A1 | 10/2009 | Garcia et al. | JP | 3-078160 | 4/1991 | |
| 2009/0297328 A1 | 12/2009 | Slocum, III | JP | 3-105704 | 5/1991 | |
| 2010/0165501 A1 | 7/2010 | Polyakov et al. | JP | 3-207947 | 9/1991 | |
| 2010/0168906 A1 | 7/2010 | Toscano et al. | JP | 3-210662 | 9/1991 | |
| 2010/0172722 A1 | 7/2010 | Noble et al. | JP | 3-212859 | 9/1991 | |
| 2010/0174404 A1 | 7/2010 | Slocum, III | JP | 3-214490 | 9/1991 | |
| 2010/0193661 A1 | 8/2010 | Merrow | JP | 3-240821 | 10/1991 | |
| 2010/0265609 A1 | 10/2010 | Merrow et al. | JP | 3-295071 | 12/1991 | |
| 2010/0302678 A1 | 12/2010 | Merrow | JP | 4-017134 | 1/1992 | |
| 2011/0012632 A1 | 1/2011 | Merrow et al. | JP | 4-143989 | 5/1992 | |
| 2011/0013666 A1 | 1/2011 | Merrow et al. | JP | 4-172658 | 6/1992 | |
| 2011/0064546 A1 | 3/2011 | Merrow | JP | 4-214288 | 8/1992 | |
| 2011/0083825 A1 | 4/2011 | Merrow | JP | 4-247385 | 9/1992 | |
| 2011/0157825 A1 | 6/2011 | Merrow et al. | JP | 4-259956 | 9/1992 | |
| | | | JP | 4-307440 | 10/1992 | |
| FOREIGN PATENT DOCUMENTS | | | JP | 4-325923 | 11/1992 | |
| CN | 1177187 | 3/1998 | JP | 5-035053 | 2/1993 | |
| CN | 2341188 | 9/1999 | JP | 5-035415 | 2/1993 | |
| CN | 1114109 | 7/2003 | JP | 5-066896 | 3/1993 | |
| CN | 1192544 | 3/2005 | JP | 5-068257 | 3/1993 | |
| DE | 3786944 | 11/1993 | JP | 5-073566 | 3/1993 | |
| DE | 69111634 | 5/1996 | JP | 5-073803 | 3/1993 | |
| DE | 69400145 | 10/1996 | JP | 5-101603 | 4/1993 | |
| DE | 19701548 | 8/1997 | JP | 5-173718 | 7/1993 | |
| DE | 19804813 | 9/1998 | JP | 5-189163 | 7/1993 | |
| DE | 69614460 | 6/2002 | JP | 5-204725 | 8/1993 | |
| DE | 69626584 | 12/2003 | JP | 5-223551 | 8/1993 | |
| DE | 19861388 | 8/2007 | JP | 6-004220 | 1/1994 | |
| EP | 0210497 | 7/1986 | JP | 6-004981 | 1/1994 | |

| | | |
|---|---|---|
| JP | 6-162645 | 6/1994 |
| JP | 6-181561 | 6/1994 |
| JP | 6-215515 | 8/1994 |
| JP | 6-274943 | 9/1994 |
| JP | 6-314173 | 11/1994 |
| JP | 7-007321 | 1/1995 |
| JP | 7-029364 | 1/1995 |
| JP | 7-037376 | 2/1995 |
| JP | 7-056654 | 3/1995 |
| JP | 7-111078 | 4/1995 |
| JP | 7-115497 | 5/1995 |
| JP | 7-201082 | 8/1995 |
| JP | 7-226023 | 8/1995 |
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007 220184 | 8/2007 |
| JP | 2007- 293936 | 11/2007 |
| JP | 2007- 305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| KR | 20-0369365 Y1 | 12/2004 |
| SG | 45223 | 1/1998 |
| TW | 387574 | 4/2000 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Biber et al., "Disk Drive Drawer Thermal Management", Advances in Electronic Packaging vol. 1:43-46, 1995.
Chung et al., "Vibration Absorber for Reduction of the In-plane Vibration in an Optical Disk Drive", IEEE Transactions on Consumer Electronics, Vo. 48, May 2004.
FlexStar Technology, 30E/Cascade Users Manual, Doc #98-36387-00 Rev. 1.8, pp. 1-33.
FlexStar Technology, "A World of Storage Testing Solutions," http://www.flexstar.com, 1 page (1999).
FlexStar Technology, "Environment Chamber Products," http://www.flexstar.com, 1 page (1999).
FlexStar Technology, "FlexStar's Family of Products," http://www.flexstar.com, 1 page (1999).
Gurumurthi, "The Need for temperature-Aware Storage Systems", The Tenth Intersociety conference on Thermal and Thermomechanical Phenomena in Electronics, ITHERM pp. 387-394, 2006.
Gurumurthi et al., "Thermal Issues in Disk Drive Design: Challenges and Possible Solutions", ACM Transactions on Storage 2:41-73, Feb. 2006.
Henderson, "HAD High Aerial Densities Require Solid Test Fixtures", Flexstar Technology.
Lindner, "Disk drive mounting", IBM Technical Disclosure Brochure, vol. 16, No. 3, pp. 903-904, Aug., 1973.
Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.
Morris, "Zero Cost Power and Cooling Monitor System", www.delphion.com/tdbs/tdb?order=94A+61950, 3 pages, Jan. 15, 2008.
Notification of Transmittal of The International Search Report and the Written Opinion of the International Searching Authority, or the Declaration, PCT/US2008/086181, 15 pages, Mar. 16, 2009.
Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.
Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", in FAST'07: 5th USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single cell—Production Test Systems" www.xyratex.com/products/production-test-systems/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Invitation to Pay Additional Fees and, Where Applicable, Protest Fee, PCT/US2008/086814, pp. 1-5, dated Mar. 4, 2009.

Invitation to Pay Additional Fees and, Where Applicable, Protest Fee, PCT/US2008/086809, pp. 1-6, dated Mar. 4, 2009.

Cardinal Intellectual Property's search report including the results of a search for the features of the claims included in the U.S. patent application entitled "Vibration Isolation Within Disk Drive Testing Systems," inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/767,113. The foregoing U.S. patent application is a continuation of U.S. Appl. No. 11/959,133.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Fish & Richardson P.C., Request for Reconsideration in response to the Decision on Petition to Make Special for New Application Under 37 C.F.R. 1.102 in U.S. Appl. No. 12/727,150, Request filed on Jun. 11, 2010, 4 pages.

Fish & Richardson P.C., Accelerated Examination Support Document and Accompanying Table 1 in U.S. Appl. No. 12/727,150, filed Jun. 11, 2010, 12 pages.

Exhibit 1 in Xyratex Technology, *LTD* v. *Teradyne, Inc.*; Newspaper picture that displays the CSO tester; 1990.

Exhibit 2 in Xyratex Technology, *LTD* v. *Teradyne, Inc.*; Photos of the CSO tester obtained from Hitachi; 1990.

Exhibit 1326 in Xyratex Technology, *LTD* v. *Teradyne, Inc.*; Image of the back of Exhibit 1 and Exhibit 2 photos, which display the photos' dates; 1990.

Exhibit 1314 in Xyratex Technology, *LTD* v. *Teradyne, Inc.*; Case, "Last products of Disk-File Development at Hursley and Millbrook," IBM, Oct. 12, 1990.

Exhibit 1315 in Xyratex Technology, *LTD* v. *Teradyne, Inc.*; Case, "History of Disk-File Development at Hursley and Millbrook," IBM, Oct. 17, 1990.

Xyratex Technology, *LTD* v. *Teradyne, Inc.*, Teradyne, Inc's Prior Art Notice Pursuant to 35 U.S.C. Section 282. Case No. CV 08-04545 SJO (PLAx), Oct. 16, 2009.

Xyratex Technology, *LTD* v. *Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

Abraham et al., "Thermal Proximity Imaging of Hard-Disk Substrates", IEEE Transactions on Mathematics 36:3997-4004, Nov. 2000.

Anderson et al., "High Reliability Variable Load Time Controllable Vibration Free Thermal Processing Environment", Delphion, hhttps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Christensen, "How Can Great firms Fail? Insights from the hard Disk Drive Industry", Harvard Business School Press, pp. 1-26, 2006.

Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP-vol. 19-2, Advances in Electronic Packaging, vol. 2:2203-2208, ASME 1997.

Ku, "Investigation of Hydrodynamic Bearing Friction in Data Storage information System Spindle Motors", ISPSvo1. 1, Advances in Information Storage and Processing Systems, pp. 159-165, ASME 1995.

McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.

Prater et al., "Thermal and Heat-Flow Aspects of Actuators for Hard Disk Drives", InterSociety Conference on Thermal Phenomena, pp. 261-268, 1994.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS-vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk Drive Analyzer Product Literature, date accessed Jan. 28, 2009, 2 pages.

Notification of Transmittal of the International Search Report and the Written Opinion of the International Searching Authority, or the Declaration, for International Application No. PCT/US2009/039926, Sep. 1, 2009, 13 pages.

Notification of Transmittal of the International Search Report and the Written Opinion of the International Searching Authority, or the Declaration, for International Application No. PCT/US2009/039591, Aug. 31, 2009, 10 pages.

International Search Report and Written Opinion of the International Searching Authority in connection with International Application No. PCT/US2008/086814; dated Sep. 18, 2009. 50 pages.

International Search Report and Written Opinion of International Searching Authority in connection with International Application No. PCT/US2008/086809; dated Sep. 17, 2009. 52 pages.

PCT Notification Concerning Transmittal of International Preliminary Report on Patentability and Written Opinion of the International Searching Authority from related International Application No. PCT/US2009/039590 dated Oct. 28, 2010.

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.

Frankovich, "The Basics of Vibration Isolation Using Elastomeric Materials", EARSC 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May, 1996 http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture Proceedings of the $32^{nd}$ Annual International Symposium on Computer Architecture, pp. 38-49, 2005 http://portal.acm.org/citation.cfm?id=1069807.1069975.

Johnson et al., "Performance Measurements of Tertiary Storage Devices", Proceedings of the $24^{th}$ VLDB Conference, New York, pp. 50-61, 1998.

Nagarajan, "Survey of Cleaning and cleanliness Measurement in Disk Drive Manufacture", North Carolina Department of Environment and Natural Resources, Feb. 1997.

Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.

Annex to Form PCT/ASA/206 Communication Relating to the Results of the Partial International Search, for International Application No. PCT/US2008/086814, dated Apr. 3, 2009, 5 pages.

Notification of Transmittal of the International Search Report and the Written Opinion of the International Searching Authority, or the Declaration, for International Application No. PCT/US2008/086814, Sep. 18, 2009, 17 pages.

Notification of Transmittal of the International Search Report and the Written Opinion of the International Searching Authority, or the Declaration, for International Application No. PCT/US2009/039888, Sep. 28, 2009, 13 pages.

Notification of Transmittal of the International Search Report and the Written Opinion of the International Searching Authority, or the Declaration, for International Application No. PCT/US2009/039921, Sep. 25, 2009, 14 pages.

Notification of Transmittal of the International Search Report and the Written Opinion of the International Searching Authority, or the Declaration, for International Application No. PCT/US2009/040058, Sep. 29, 2009, 13 pages.

Notification of Transmittal of the International Search Report and the Written Opinion of the International Searching Authority, or the Declaration, for International Application No. PCT/US2009/040829, Oct. 28, 2009, 13 pages.

Notification of Transmittal of the International Search Report and the Written Opinion of the International Searching Authority, or the Declaration, for International Application No. PCT/US2009/039590, Oct. 30, 2009, 10 pages.

Notification of Transmittal of the International Search Report and the Written Opinion of the International Searching Authority, or the Declaration, for International Application No. PCT/US2009/040835, Oct. 30, 2009, 13 pages.

Notification of Transmittal of the International Search Report and the Written Opinion of the International Searching Authority, or the Declaration, for International Application No. PCT/US2009/040757, Nov. 23, 2009, 12 pages.

Notification of Transmittal of the International Search Report and the Written Opinion of the International Searching Authority, or the Declaration, for International Application No. PCT/US2009/039898, Nov. 24, 2009, 12 pages.

Notification of Transmittal of the International Search Report and the Written Opinion of the International Searching Authority, or the Declaration, for International Application No. PCT/US2009/040795, Nov. 26, 2009, 13 pages.

Notification of Transmittal of the International Search Report and the Written Opinion of the International Searching Authority, or the Declaration, for International Application No. PCT/US2009/045583, Nov. 27, 2009, 13 pages.

Notification of Transmittal of the International Search Report and the Written Opinion of the International Searching Authority, or the Declaration, for International Application No. PCT/US2009/040888, Dec. 29, 2009, 14 pages.

Notification of Transmittal of the International Search Report and the Written Opinion of the International Searching Authority, or the Declaration, for International Application No. PCT/US2009/040894, Dec. 22, 2009, 12 pages.

Notification of Transmittal of the International Search Report and the Written Opinion of the International Searching Authority, or the Declaration, for International Application No. PCT/US2009/039934, Dec. 23, 2009, 12 pages.

Notification of Transmittal of the International Search Report and the Written Opinion of the International Searching Authority, or the Declaration, for International Application No. PCT/US2009/040965, Dec. 23, 2009, 12 pages.

Notification of Transmittal of the International Search Report and the Written Opinion of the International Searching Authority, or the Declaration, for International Application No. PCT/US2009/040973, Jan. 11, 2010, 13 pages.

Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536.

Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The foregoing U.S. patent application is a continuation of U.S. Appl. No. 12/424,980.

Cardinal Intellectual Property's search report including the results of a search for the features of the claims included in the U.S. patent application entitled "Processing Storage Devices", inventors: Richard W. Slocum III., and having assigned U.S. Appl. No. 12/727,619.

The foregoing U.S. patent application is a continuation of U.S. Appl. No. 12/474,388, US PG Pub. 2010/0174404.

Cardinal Intellectual Property's search report including the results of a search for the features of the claims included in the U.S. patent application entitled "Bulk Feeding Disk Drives To Disk Drive Testing Sysytems", inventors: Noble et al., and having assigned U.S. Appl. No. 12/727,856. The foregoing U.S. patent application is a continuation of U.S. Appl. No. 12/104,869.

Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069.

Cardinal Intellectual Property's search report including the results of a search for the features of the claims included in the U.S. patent application entitled "Test Slot Cooling System for A Storage Device Testing System", inventors: Merrow et al., and having assigned U.S. Appl. No. 13/045,783. The foregoing U.S. patent application is a continuation of U.S. Appl. No. 12/503,567.

Cardinal Intellectual Property's search report including the results of a search for the features of the claims included in the U.S. patent application entitled "Storage Device Testing System Cooling", inventors: Brian S. Merrow and having assigned U.S. Appl. No. 12/815,140. The foregoing U.S. patent application is a continuation of U.S. Appl. No. 12/698,575.

Cardinal Intellectual Property's search report including the results of a search for the features of the claims included in the U.S. patent application entitled "Conductive Heating", inventors: Brian S. Merrow et al., and having assigned U.S. Appl. No. 12/836,915. The foregoing U.S. patent application is a continuation of U.S. Appl. No. 12/503,593.

Cardinal Intellectual Property's search report including the results of a search for the features of the claims included in the U.S. patent application entitled "Conductive Temperature Sensing", inventors: Brian S. Merrow et al., and having assigned U.S. Appl. No. 12/760,305. The foregoing U.S. patent application is a continuation of U.S. Appl. No. 12/503,687, US PG Pub. 2011/0013666.

Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. Appl. No. 12/105,103.

Cardinal Intellectual Property's search report including the results of a search for the features of the claims included in the U.S. patent application entitled "Single Test Slot for Dynamic Isolation of Hard Drive", inventors: Brian S. Merrow and having assigned U.S. Appl. No. 12/767,142. The foregoing U.S. patent application is a continuation of U.S. Appl. No. 12/105,105.

Cardinal Intellectual Property's search report including the results of a search for the features of the claims included in the U.S. patent application entitled "Hard Drive Transport Sled", inventors: Brian S. Merrow et al., and having assigned U.S. Appl. No. 12/834,459. The foregoing U.S. patent application is a continuation of U.S. Appl. No. 12/959,133, US PG Pub. 2010/0265609.

Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/937,918. The foregoing U.S. patent application is a continuation of U.S. Appl. No. 12/105,061.

* cited by examiner

TRANSFERRING DISK DRIVES WITHIN DISK DRIVE TESTING SYSTEMS

TECHNICAL FIELD

This disclosure relates to transferring disk drives within disk drive testing systems.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously in batches. Disk drive testing systems typically include one or more racks having multiple test slots that receive disk drives for testing.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower test yields and increased manufacturing costs.

Current disk drive testing systems use an operator, a robotic arm, or a conveyer belt to individually feed disk drives to a transfer location for loading into the testing system for testing. A robotic arm of the testing system individually retrieves the disk drives from the transfer location and loads them in test slots for testing.

SUMMARY

In one aspect, a method of transferring disk drives within a disk drive testing system includes actuating an automated transporter (e.g. robotic arm, gantry system, or multi-axis linear actuator) to retrieve multiple disk drives presented for testing, and actuating the automated transporter to deliver each retrieved disk drive to a respective test slot of the disk drive testing system and to insert each disk drive in the respective test slot.

Implementations of this aspect of the disclosure may include one or more of the following features. In some implementations, the method includes actuating the automated transporter to retrieve multiple disk drive transporters, actuating the automated transporter to retrieve the disk drives presented for testing by carrying each of the disk drives with respective disk drive transporters, and actuating the automated transporter to deliver the disk drive transporters, each carrying one of the disk drives, to the respective test slots. In some examples, each of the disk drive transporters is inserted into a respective test slot, engaging the carried disk drive with a respective connector of the disk drive testing system. The inserted disk drive transporters provide closure of their respective test slots.

In some implementations, the disk drives are present in at least one disk drive tote presented to the disk drive testing system. The automated transporter retrieves each of the disk drives from the at least one disk drive tote with the corresponding disk drive transporter by positioning the disk drive transporter below the disk drive, lifting the disk drive off a disk drive support of the disk drive tote, and carrying the disk drive in the disk drive transporter away from the disk drive tote.

The automated transporter preferably includes a manipulator configured to transport multiple disk drives. For example, in the case of a robotic arm as the automated transporter, the manipulator is secured to a distal end of the robot arm. In some examples, the manipulator includes first and second connectors disposed on a manipulator body and arranged in a substantially V-shaped configuration with respect to each other. The connectors are configured to releasably attach to a disk drive transporter.

In another aspect, a method of transferring disk drives within a disk drive testing system includes actuating an automated transporter having a manipulator to retrieve an untested disk drive presented for testing. The manipulator is configured to transport multiple disk drives. The method includes actuating the automated transporter to deliver the retrieved untested disk drive to a respective test slot of the disk drive testing system and insert the untested disk drive in its respective test slot for testing.

Implementations of this aspect of the disclosure may include one or more of the following features. In some implementations, the manipulator includes first and second connectors disposed on a manipulator body and arranged in a substantially V-shaped configuration with respect to each other. However, in some examples, the first and second connectors are disposed 180 degrees from one another. The connectors are configured to releasably attach to a disk drive transporter.

In some examples, the method includes actuating the automated transporter to retrieve a disk drive transporter, actuating the automated transporter to retrieve the untested disk drive presented for testing by carrying the untested disk drive with the disk drive transporter, and actuating the automated transporter to deliver the disk drive transporter to the respective test slot. The disk drive transporter is inserted into the test slots, engaging the carried untested disk drive with a respective connector of the disk drive testing system. The inserted disk drive transporter provides closure of its respective test slot.

In some implementations, the untested disk drive is present in a disk drive tote presented to the disk drive testing system. The automated transporter retrieves the untested disk drive from the disk drive tote with the corresponding disk drive transporter by positioning the disk drive transporter below the untested disk drive, lifting the untested disk drive off a disk drive support of the disk drive tote, and carrying the untested disk drive in the disk drive transporter away from the disk drive tote.

In some implementations, the method includes actuating the automated transporter and the manipulator to retrieve a tested disk drive from its respective test slot and carrying the tested disk drive to a destination location, such as a destination disk drive tote. The method may include actuating the automated transporter to retrieve the tested disk drive from its respective test slot by actuating the manipulator to engage a respective disk drive transporter of the tested disk drive and carrying the tested disk drive with its respective disk drive transporter to the destination location. The method may include actuating the automated transporter to deliver the disk drive carried by its respective disk drive transporter to a receptacle of a destination disk drive tote.

In another aspect, a method of transferring disk drives within a disk drive testing system includes actuating an automated transporter having a manipulator to retrieve a first disk drive housed in a first test slot of the disk drive testing system. The manipulator is configured to transport multiple disk drives. The method includes actuating the automated transporter to deliver the retrieved first disk drive to a second test slot, actuating the automated transporter to retrieve a second disk drive from the second test slot while carrying the first disk drive, and actuating the automated transporter to insert the first disk drive into the second test slot while carrying the second disk drive.

Implementations of this aspect of the disclosure may include one or more of the following features. In some implementations, the method includes actuating the automated transporter to deliver the retrieved second disk drive to the first test slot, and actuating the automated transporter to insert the second disk drive into the first test slot. The manipulator includes a manipulator body and first and second connectors disposed on the manipulator body. The connectors are arranged in a substantially V-shaped configuration with respect to each other and are each configured to releasably attach to a disk drive transporter. The manipulator transports the first and second disk drives in corresponding releasably attached disk drive transporters. In examples where the disk drives are each carried in a corresponding disk drive transporter, inserting each disk drive into one of the test slots includes inserting the corresponding disk drive transporter into the respective test slot, engaging the carried disk drive with a respective connector of the disk drive testing system, the inserted disk drive transporter providing closure of its respective test slot.

In yet another aspect, a disk drive testing system includes an automated transporter, at least one rack about the automated transporter for access by the automated transporter, and multiple test slots housed by each rack. Each test slot is configured to receive a disk drive for testing. A transfer station, arranged for access by the automated transporter, presents multiple disk drives for testing. A manipulator attached to the automated transporter is configured to carry multiple disk drives.

Implementations of this aspect of the disclosure may include one or more of the following features. In some implementations, the manipulator is configured to releasably attach to multiple disk drive transporters. The manipulator includes first and second connectors disposed on a manipulator body and arranged in a substantially V-shaped configuration with respect to each other. The connectors are configured to releasably attach to a disk drive transporter.

In some examples, the transfer station includes a transfer station housing configured to receive and support multiple disk drive totes in a presentation position for servicing by the automated transporter. Each disk drive tote includes a tote body defining multiple disk drive receptacles configured to each house a disk drive.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Bulk feeding of disk drives in a disk drive testing system is advantageous over manual individual feeding of disk drives by providing increased through-put and efficiency of the disk drive testing system, inter alia. As will be discussed in detail, presenting multiple disk drive totes (also referred to as totes), which hold multiple disk drives, to a disk drive testing system allows continual disk drive testing, disk sorting amongst multiple disk drive totes, minimal user intervention, and increased efficiency over current systems, inter alia. Bulk feeding of disk drives in disk drive totes provides the advantage of shop floor flexibility (e.g. by providing the ability to easily redirect a disk drive tote or a cart or trolley carrying disk drive totes versus rerouting fixed conveyors). An operator can present a batch of drives (e.g. via the disk drive tote) to the disk drive testing system and then walk away to service another system. Bulk feeding of disk drives in disk drive totes also allows automatic sorting of tested drives with the disk drive totes, as will be discussed below.

Figure 1:
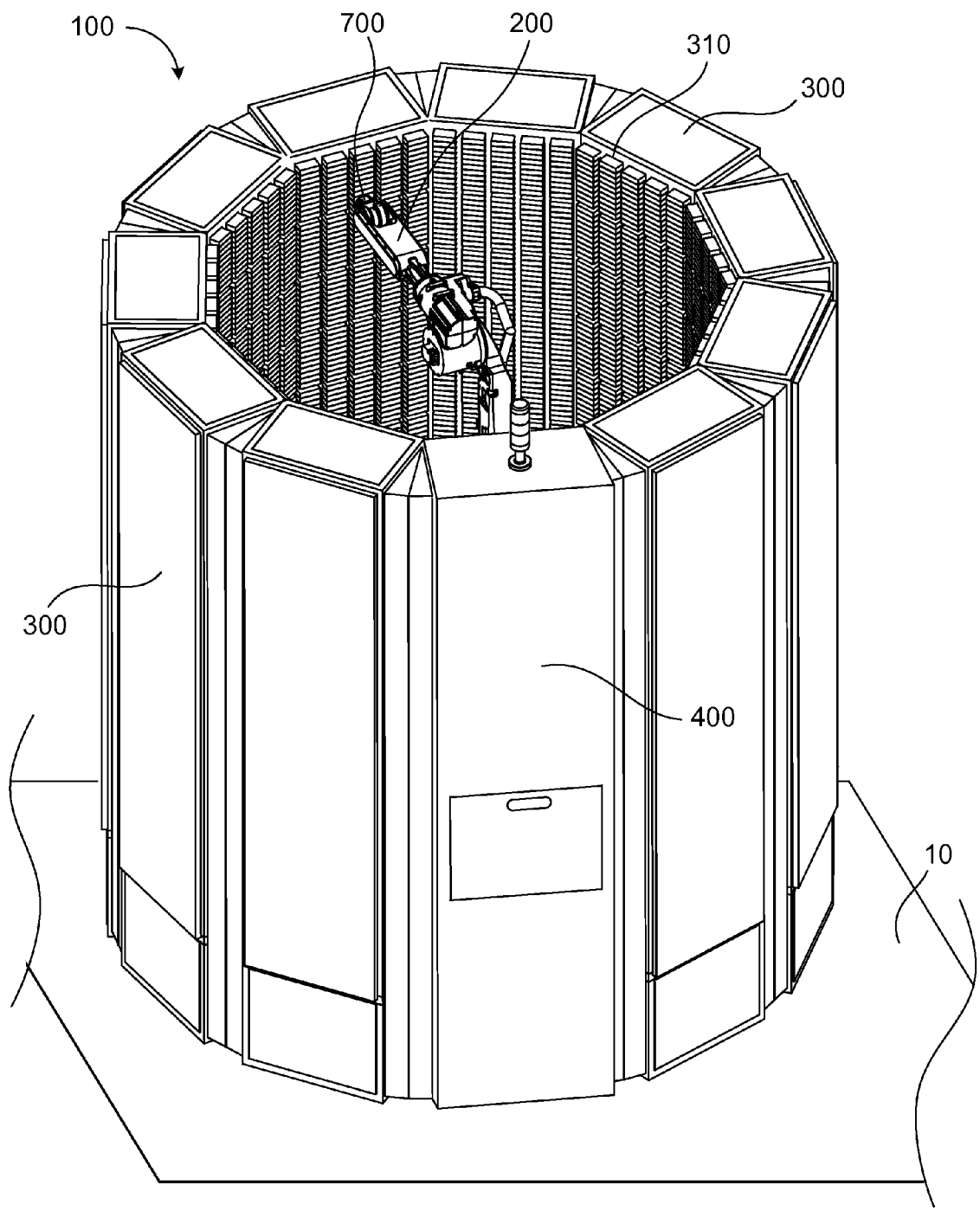
FIG. 1 is a perspective view of a disk drive testing system and a transfer station.
Figure 2:
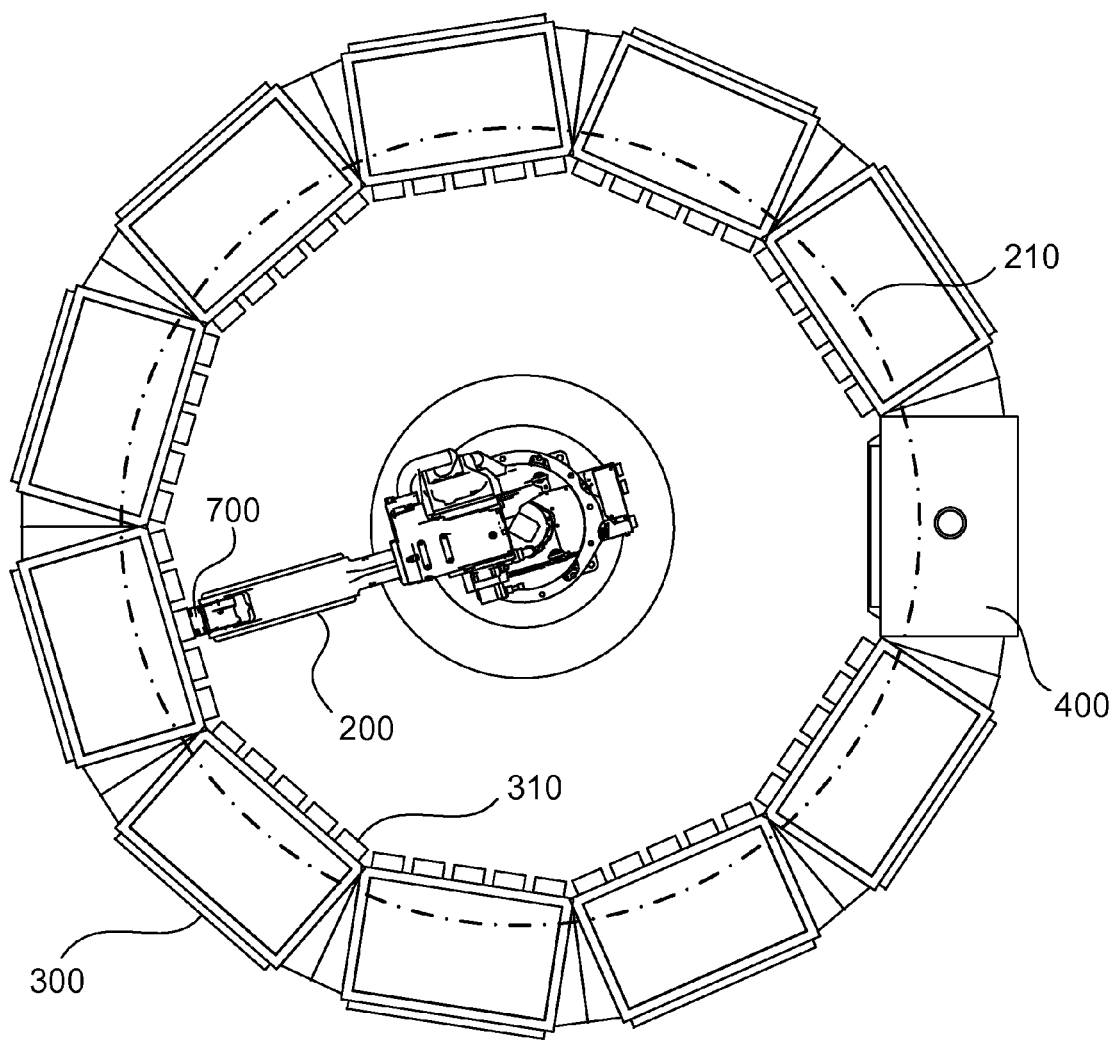
FIG. 2 is a top view of a disk drive testing system and a transfer station.
Figure 3:
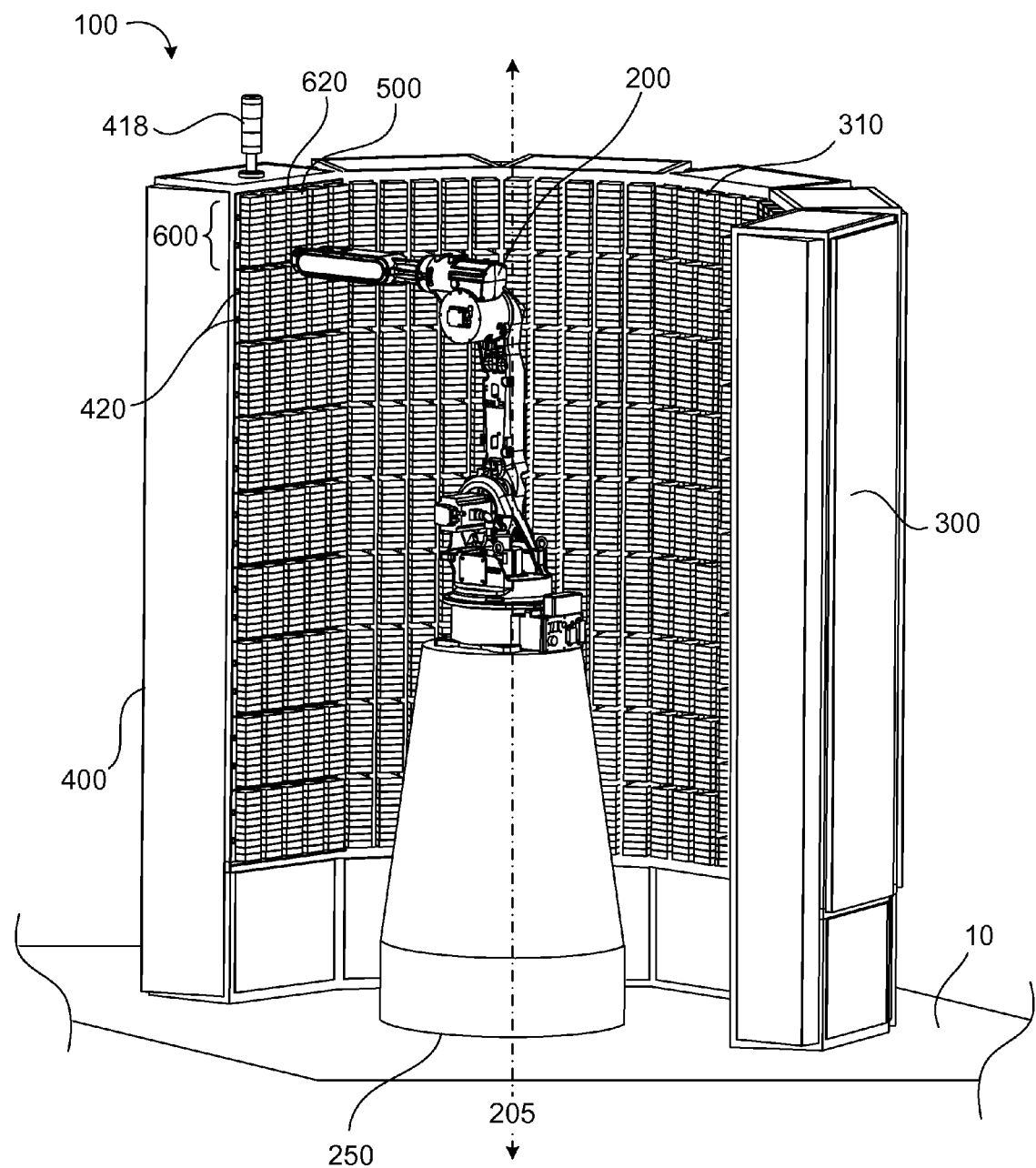
FIG. 3 is a perspective view of a disk drive testing system and a transfer station.

Referring to FIGS. 1-3, in some implementations, a disk drive testing system 100 includes at least one automated transporter 200 (e.g. robotic arm, gantry system, or multi-axis linear actuator) defining a first axis 205 (see FIG. 3) substantially normal to a floor surface 10. In the examples shown, the automated transporter 200 comprises a robotic arm 200 operable to rotate through a predetermined arc about the first axis 205 and to extend radially from the first axis 205. The robotic arm 200 is operable to rotate 360° about the first axis 205 and includes a manipulator 700 disposed at a distal end of the robotic arm 200 to handle one or more disk drives 500 and/or disk drive transporters 550 to carry the disk drives 500 (see e.g. FIGS. 5-6). Multiple racks 300 are arranged around the robotic arm 200 for servicing by the robotic arm 200. Each rack 300 houses multiple test slots 310 configured to receive disk drives 500 for testing. The robotic arm 200 defines a substantially cylindrical working envelope volume 210, with the racks 300 being arranged within the working envelope 210 for accessibility of each test slot 310 for servicing by the robotic arm 200. The substantially cylindrical working envelope volume 210 provides a compact footprint and is generally only limited in capacity by height constraints. In some examples, the robotic arm 200 is elevated by and supported on a pedestal or lift 250 on the floor surface 10. The pedestal or lift 250 increases the size of the working envelope volume 210 by allowing the robotic arm 200 to reach not only upwardly, but also downwardly to service test slots 310. The size of the working envelope volume 210 can be further increased by adding a vertical actuator to the pedestal or lift 250.

The automated transporter 200 (e.g. robotic arm) is configured to independently service each test slot 310 to provide a continuous flow of disk drives 500 through the testing system 100. A continuous flow of individual disk drives 500 through the testing system 100 allows random start and stop times for each disk drive 500, whereas other systems that require batches of disk drives 500 to be run all at once as an entire testing loaded must all have the same start and end times. Therefore, with continuous flow, disk drives 500 of different capacities can be run at the same time and serviced (loaded/unloaded) as needed.

Figure 4:
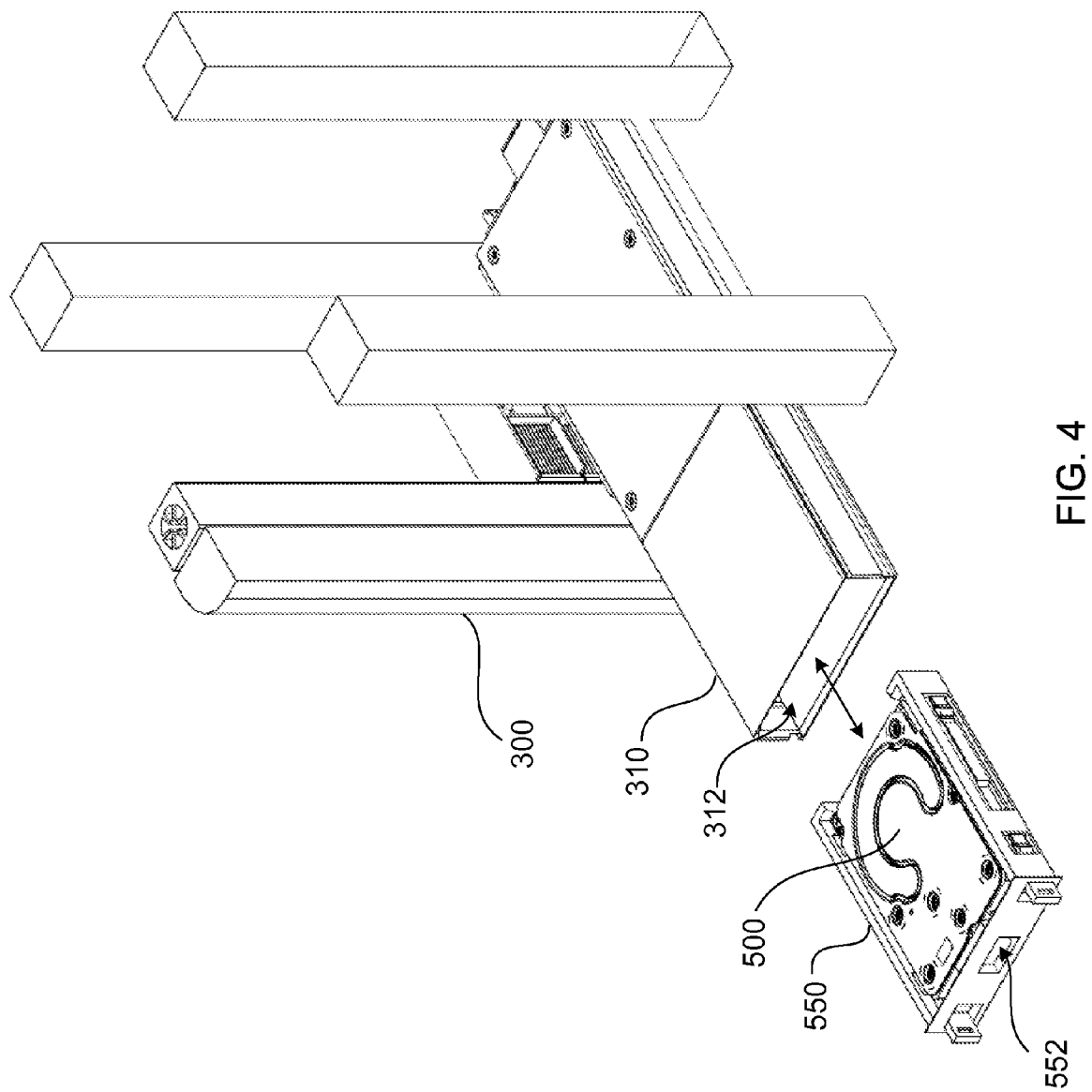
FIG. 4 is a perspective view of a disk drive being inserted into a test slot of a disk drive testing system.

Referring to FIGS. 3-4, the disk drive testing system 100 includes a transfer station 400 configured for bulk feeding of disk drives 500 to the automated transporter 200 (e.g. a robotic arm, as shown). The automated transporter 200 independently services each test slot 310 by transferring a disk drive 500 between the transfer station 400 and the test slot 310. The transfer station 400 houses one or more totes 600 carrying multiple disk drives 500 presented for servicing by the automated transporter 200. The transfer station 400 is a service point for delivering and retrieving disk drives 500 to and from the disk drive testing system 100. The totes 600 allow an operator to deliver and retrieve a collection of disk drives 500 to and from the transfer station 400. In the example shown in FIG. 3, each tote 600 is accessible from respective tote presentation support systems 420 in a presentation position and may be designated as a source tote 600 for supplying a collection of disk drives 500 for testing or as a destination tote 600 for receiving tested disk drives 500 (or both). Destination totes 600 may be classified as "passed return totes" or "failed return totes" for receiving respective disk drives 500 that have either passed or failed a functionality test, respectively.

In implementations that employ disk drive transporters 550 for manipulating disk drives 500, as shown in FIG. 4, the robotic arm 200 is configured to remove a disk drive transporter 550 from one of the test slots 310 with the manipulator 700, then pick up a disk drive 500 from one the totes 600 presented at the transfer station 400 with the disk drive transporter 550, and then return the disk drive transporter 550, with a disk drive 500 therein, to the test slot 310 for testing of the disk drive 500. After testing, the robotic arm 200 retrieves the tested disk drive 500 from the test slot 310, by removing the disk drive transporter 550 carrying the tested disk drive 500 from the test slot 310 (i.e., with the manipulator 700), carrying the tested disk drive 500 in the disk drive transporter 550 to the transfer station 400, and manipulating the disk drive transporter 550 to return the tested disk drive 500 to one of the totes 600 at the transfer station 400.

Figure 5:
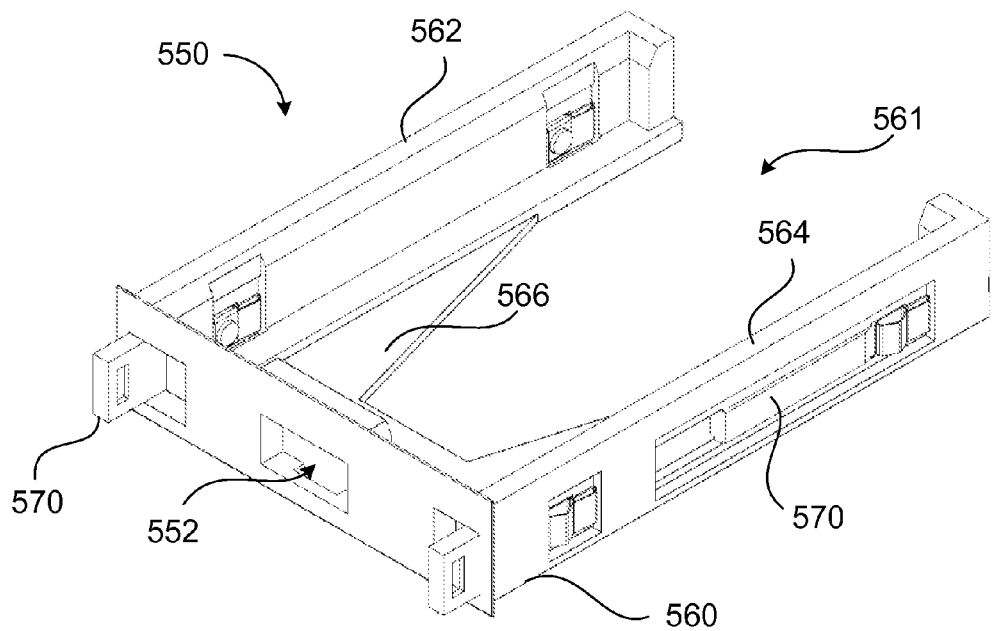
FIG. 5 is a perspective view of a disk drive transporter.
Figure 6:
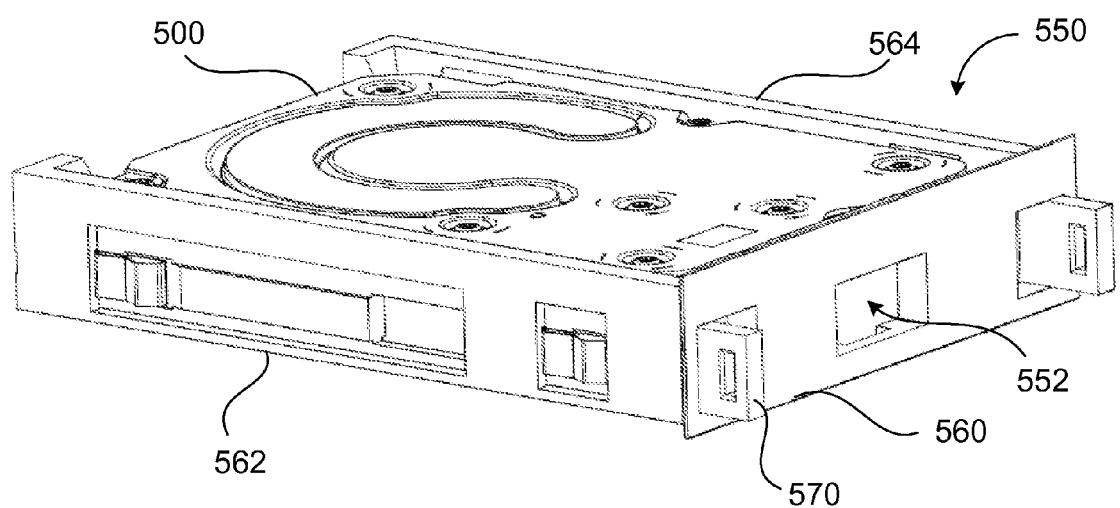
FIG. 6 is a perspective view of a disk drive transporter carrying a disk drive.
Figure 7:
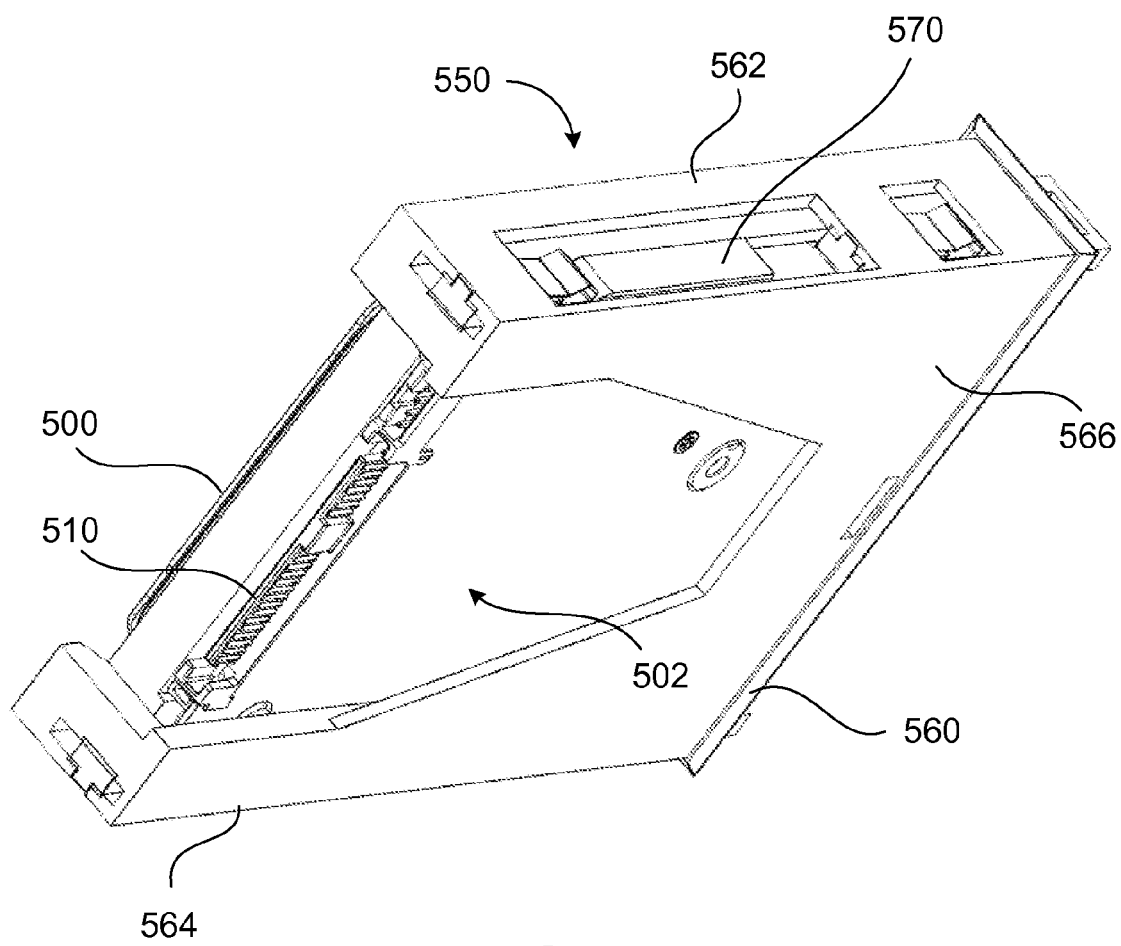
FIG. 7 is a bottom perspective view of a disk drive transporter carrying a disk drive.
Figure 8:
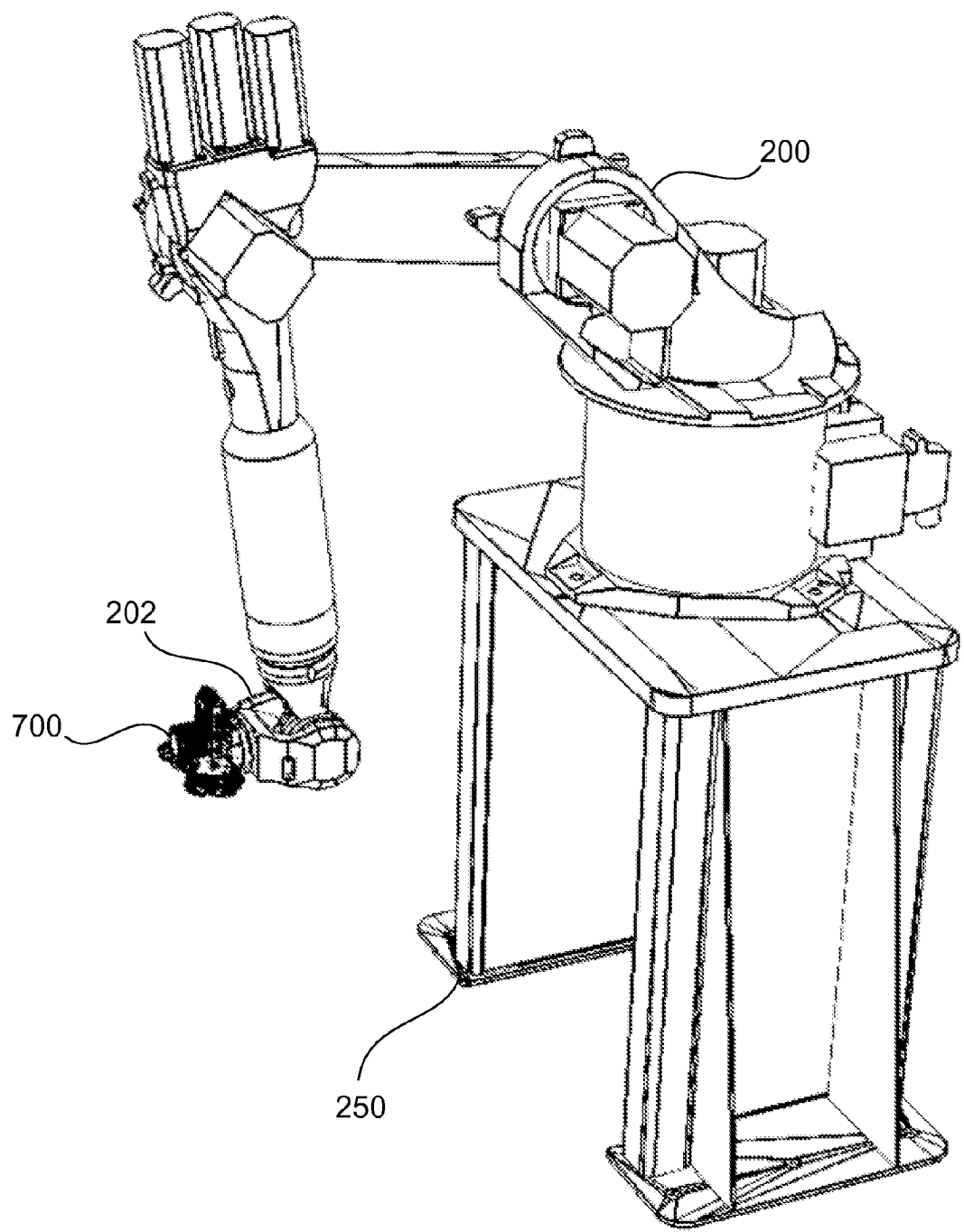
FIG. 8 is a perspective view of a robotic arm with a manipulator secured to its distal end.
Figure 9:
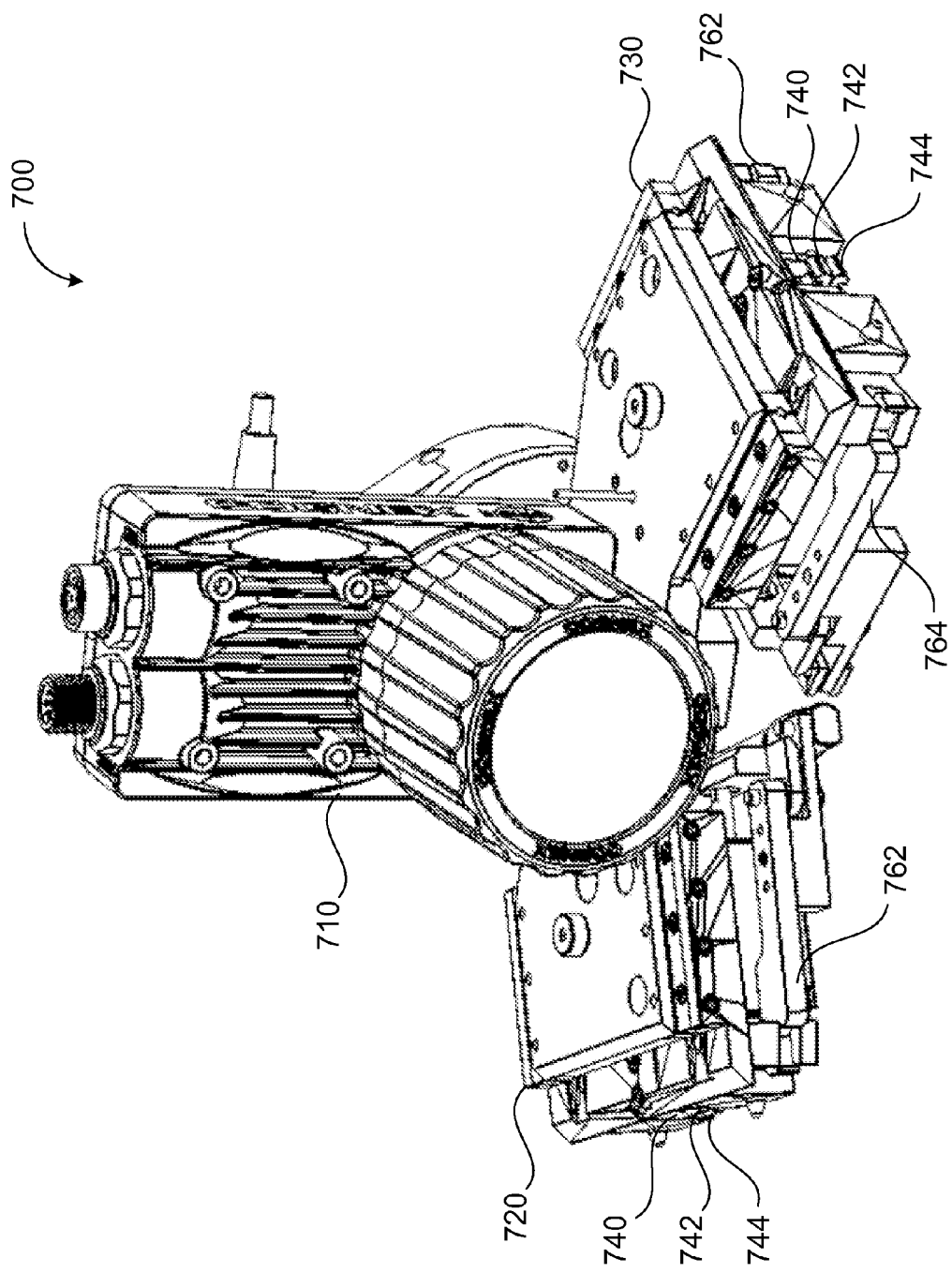
FIG. 9 is an elevated front perspective view of a manipulator for a robotic arm.
Figure 10:
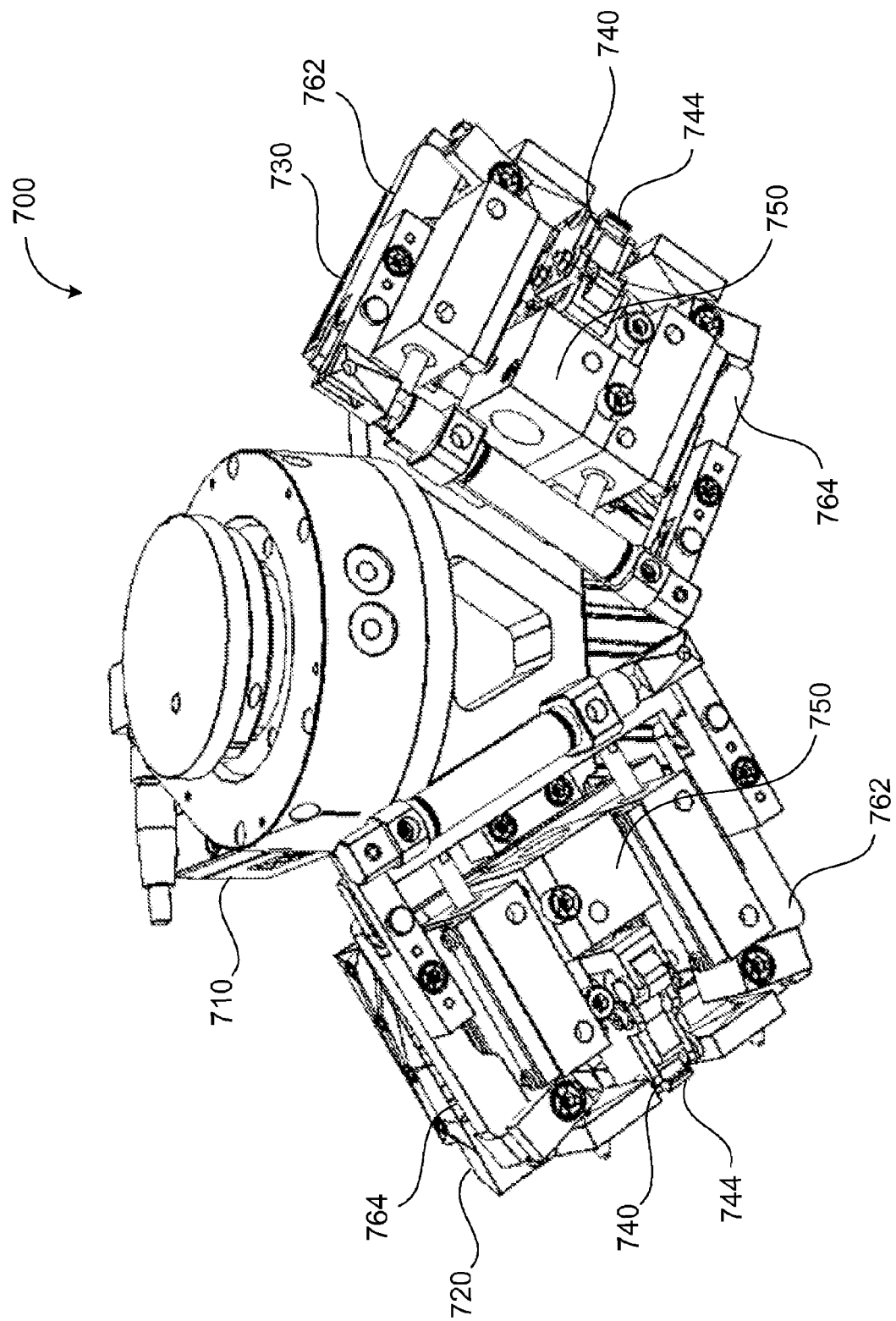
FIG. 10 is a elevated rear perspective view of the manipulator shown in FIG. 9.
Figure 11:
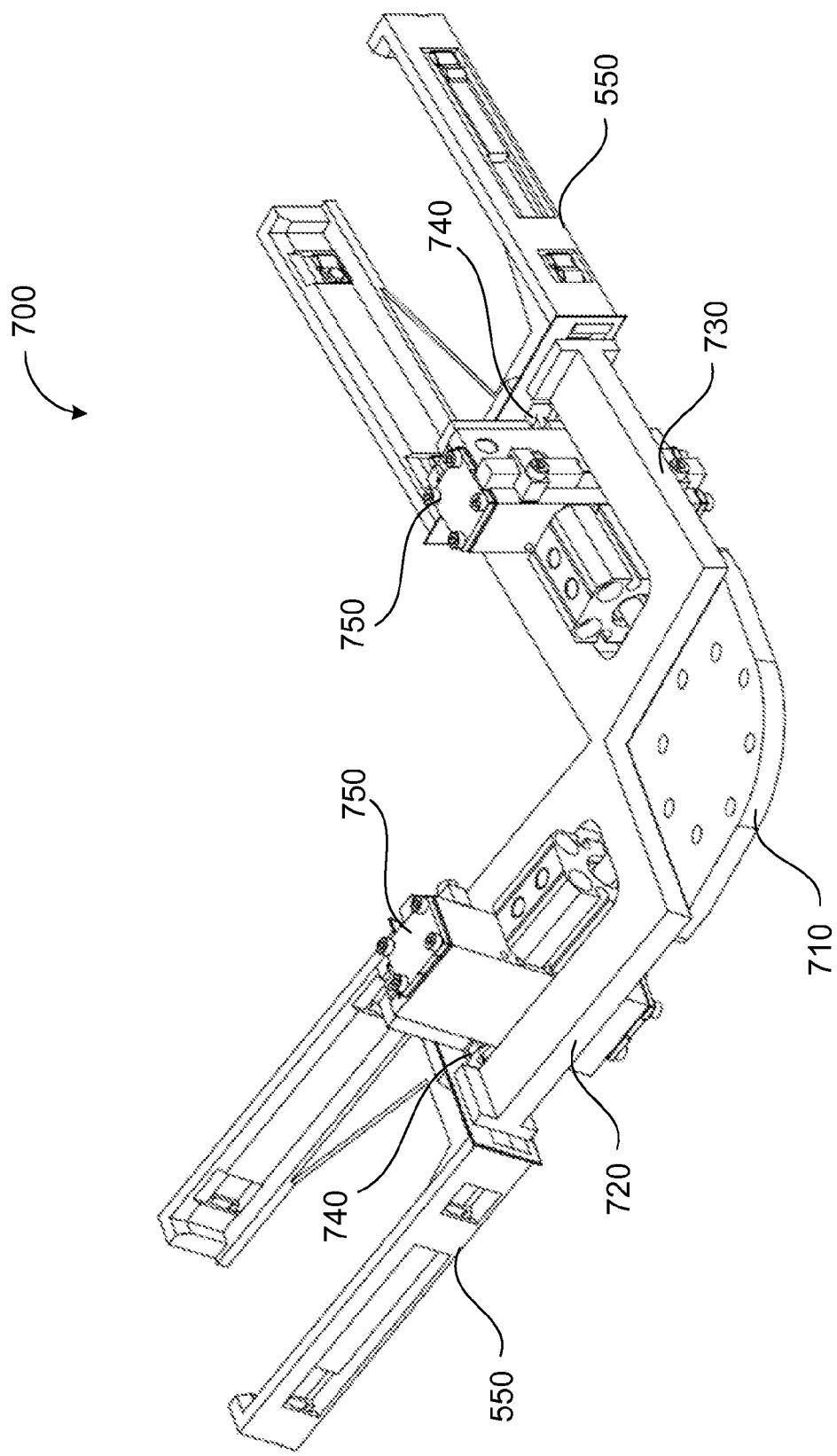
FIG. 11 is an elevated front perspective view of a manipulator for a robotic arm.

The test slot 310, shown in FIG. 4, defines an opening 312 configured to receive the disk drive transporter 550, which in this case provides closure of the test slot 310. The disk drive transporter 550 is configured to receive the disk drive 500, as shown in FIG. 5, and be handled by the automated transporter 200. In use, one of the disk drive transporters 550 is removed from one of the test slots 310 with the robot 200 (e.g., by grabbing, or otherwise engaging, the indentation 552 of the transporter 550 with the manipulator 700 of the robot 200). In some examples, as illustrated in FIGS. 5-7, the disk drive transporter 550 includes a frame 560 defining a substantially U-shaped opening 561 formed by sidewalls 562, 564 and a base plate 566 that collectively allow the frame 560 to fit around a disk drive support (not shown) in the tote 600 so that the disk drive transporter 550 can be moved (e.g., via the robotic arm 200) into a position beneath one of the disk drives 500 housed in one of multiple disk drive receptacles 620 defined by the tote 600 (see e.g., FIGS. 8-9). The disk drive transporter 550 can then be raised (e.g., by the robotic arm 310) into a position engaging the disk drive 600 for removal from the tote 600.

With the disk drive 500 in place within the frame 560 of the disk drive transporter 550, the disk drive transporter 550 and the disk drive 500 together can be moved by the robotic arm 200 for placement within one of the test slots 310, as shown in FIG. 4. In some implementations, the manipulator 700 is also configured to initiate actuation of a clamping mechanism 570 disposed in the disk drive transporter 550. This allows actuation of the clamping mechanism 570 before the transporter 550 is moved from the tote 600 to the test slot 310 to inhibit movement of the disk drive 500 relative to the disk drive transporter 550 during the move. Prior to insertion in the test slot 310, the manipulator 700 can again actuate the clamping mechanism 570 to release the disk drive 500 within the frame 560. This allows for insertion of the disk drive transporter 550 into one of the test slots 310, until the disk drive 500 is in a test position with a disk drive connector 510 engaged with a test slot connector (not shown). The clamping mechanism 570 may also be configured to engage the test slot 310, once received therein, to inhibit movement of the disk drive transporter 550 relative to the test slot 310. In such implementations, once the disk drive 500 is in the test position, the clamping mechanism 570 is engaged again (e.g., by the manipulator 700) to inhibit movement of the disk drive transporter 550 relative to the test slot 310. The clamping of the transporter 550 in this manner can help to reduce vibrations during testing. In some examples, after insertion, the disk drive transporter 550 and disk drive 500 carried therein are both clamped or secured in combination or individually within the test slot 310.

Referring to FIGS. 8-11, the manipulator 700 is secured to a distal end 202 of the robotic arm 200. The manipulator 700 includes first and second arms 720, 730 disposed on a manipulator body 710 and arranged in a substantially V-shaped configuration with respect to each other. In some implementations, the arms 720, 730 can be disposed in other arrangements, such as 180 degrees from each other or some other angle therebetween. The arms 720, 730 each have connectors 740 configured to releasably attach to a disk drive transporter 550. In the examples shown, each connector 740 includes first and second tabs 742, 744 opposely coupled to a tab actuator 750 disposed on the arm 720,730. The tab actuator 750 is operable to move its coupled tabs 742, 744 in opposing directions to releasably engage and hold a disk drive transporter 550. To grab the disk drive transporter 550, the robotic arm 200 and manipulator 700 are actuated to maneuver one of the connectors 740 to place the tabs 742, 744 into the indentation 552 of the disk drive transporter 550 and then actuate the tab actuator 740 to move the tabs 742, 744 away from each other and engage the indentation 552 to releasable attach to the disk drive transporter 550. In some examples, the tabs 742, 744 are hook shaped and/or have friction pads to engage the indentation 552 of the disk drive transporter 550. Each arm 720, 730 of the manipulator 700 has first and second clamp actuators 762, 764 configured to engage the clamping mechanism 570 of the disk drive transporter 550. The clamp actuators 762, 764 may be operable to push or pull on the clamping mechanism 570 to engage/disengage the clamping mechanism 570.

Figure 12:
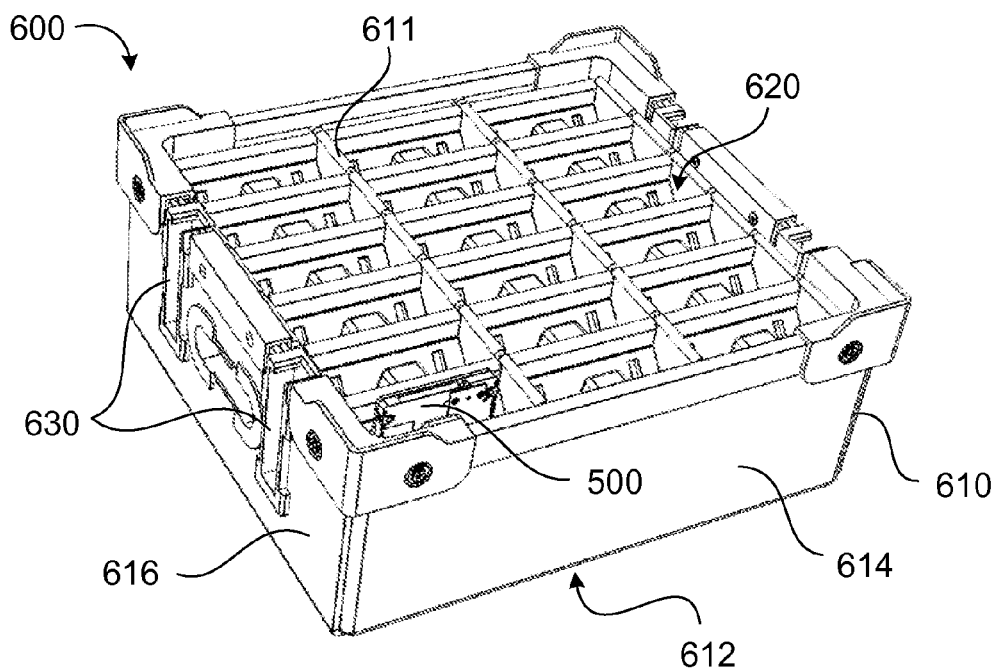
FIG. 12 is a perspective view of a disk drive tote in a loading position.
Figure 13:
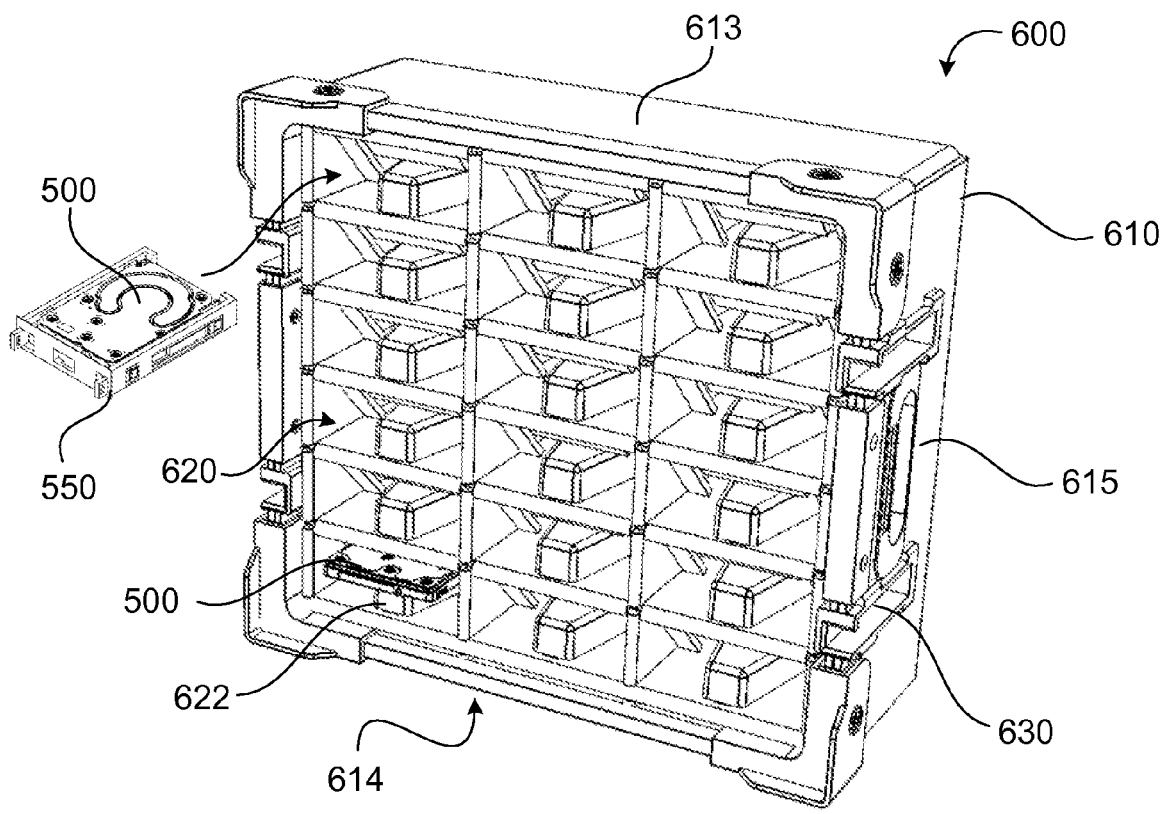
FIG. 13 is a perspective view of a disk drive tote in a presentation position.

In the example illustrated in FIGS. 12-13, the tote 600 includes a tote body 610 having a front side 611, a back side 612, a top side 613, a bottom side 614, a right side 615 and a left side 616. The tote body 610 defines multiple disk drive receptacles 620 in the front side 611 that are each configured to house a disk drive 500. In some examples, the tote 600 rests on its back side 612 while in the loading position, such that the disk drive receptacles 620 are substantially vertical and face upward, as shown in FIG. 12. In other examples, the tote 600 is held in another orientation while in the loading position, such as at an incline or in a vertical orientation, as with the presentation position. In the presentation position, the tote 600 rests on its bottom side 614, such that the disk drive receptacles 620 are substantially horizontal and face laterally, as shown in FIG. 13. The tote body 610 defines arm grooves 630 in the right and left sides 615, 616 of the tote body 610 that are configured to support the tote 600.

In the example shown, each disk drive receptacle 620 includes a disk drive support 622 configured to support a central portion 502 (see FIG. 7) of the received disk drive 500 to allow manipulation of the disk drive 500 along non-central portions. In some implementations, the disk drive support 622 is configured to support the disk drive 500 at an incline, while the tote 600 is in a substantially vertical orientation, such that the disk drive 500 has a tending to slide deeper into the disk drive receptacle 620, rather than out of the disk drive receptacle 620. To remove a housed disk drive 500 from the disk drive receptacle 620, the disk drive transporter 550 is positioned below the disk drive 500 (e.g. by the robotic arm 200) in the disk drive receptacle 620 and elevated to lift the disk drive 500 off of the disk drive support 622. The disk drive transporter 550 is then removed from the disk drive receptacle 620 while carrying the disk drive 500 for delivery to a destination target, such as a test slot 310.

Figure 14:
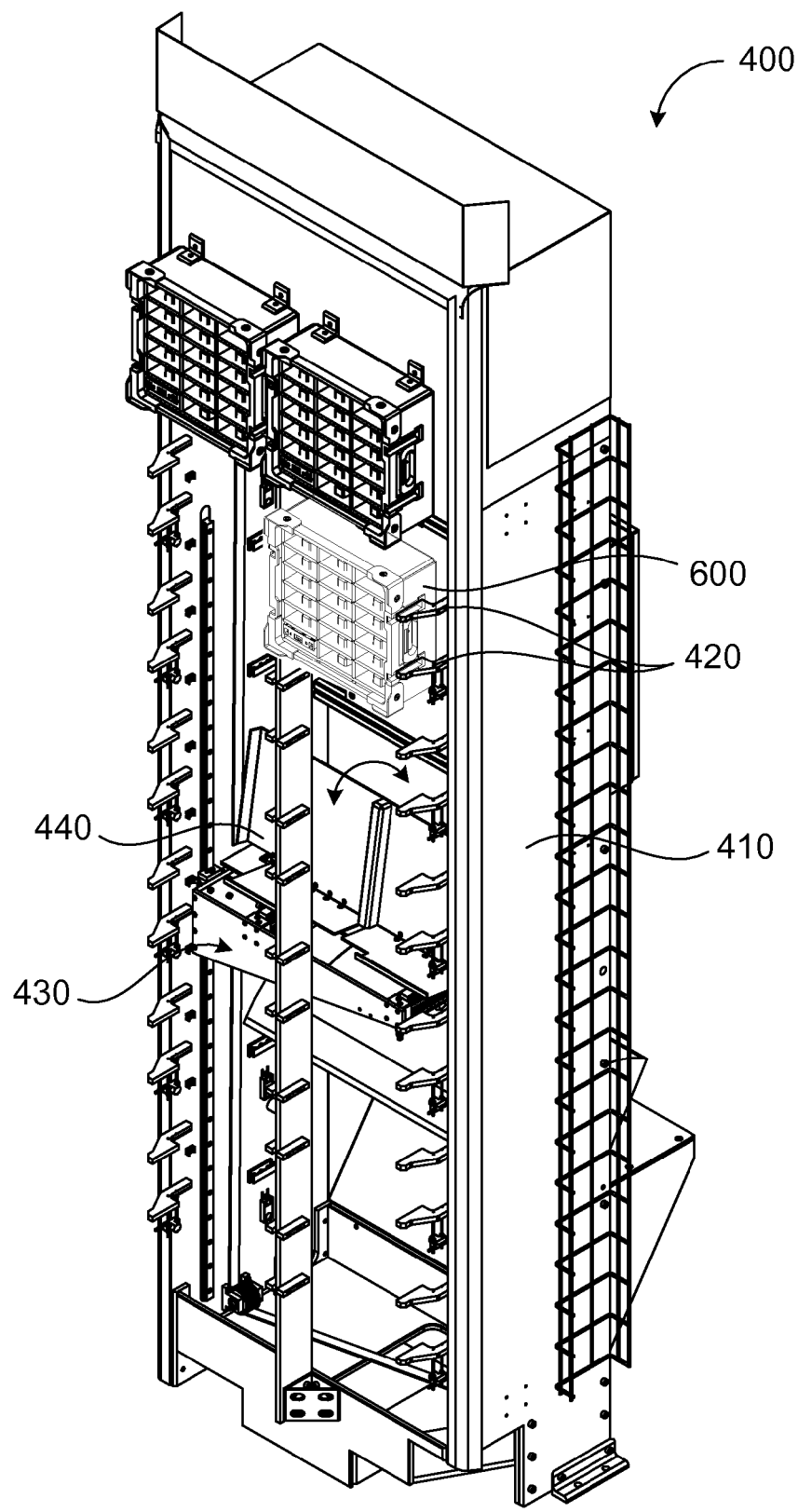
FIG. 14 is a perspective view of a transfer station.

Referring to FIG. 14, in some implementations, the transfer station 400 includes a transfer station housing 410 and multiple tote presentation support systems 420 disposed on the transfer station housing 410. Each tote presentation support system 420 is configured to receive and support a disk drive tote 600 in a presentation position for servicing by the disk drive testing system 100.

Figure 15:
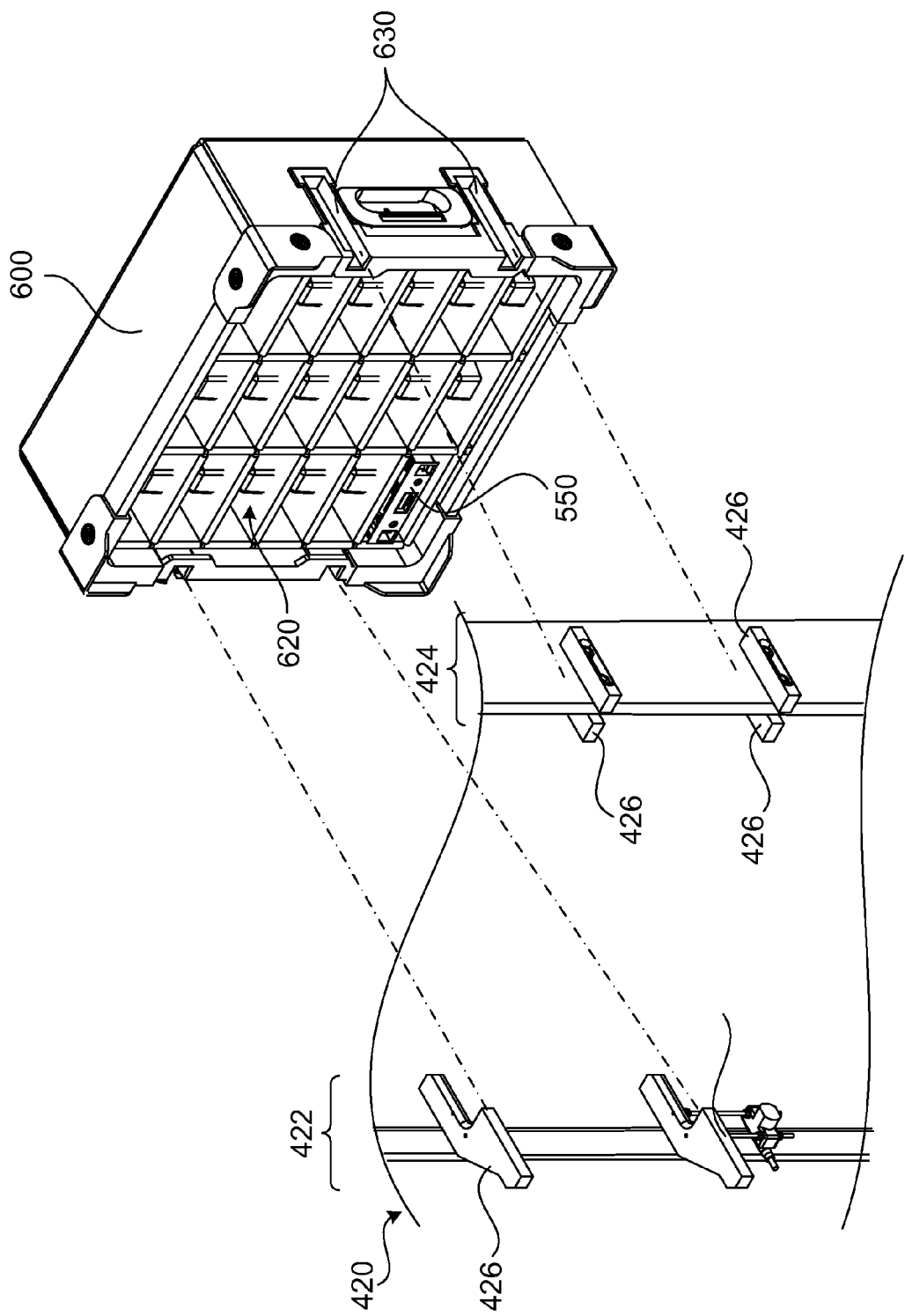
FIG. 15 is a perspective view of a tote in a presentation position for placement on a tote presentation support system of a transfer station.

In some implementations, the tote presentation support systems 420 are each disposed on the same side of the transfer station housing 410 and arranged vertically with respect to each other. Each tote presentation support systems 420 has a different elevation with respect to the others. In some examples, as shown in FIG. 15, the tote presentation support system 420 includes first and second opposing pairs 422, 424 of tote support arms 426 configured to be received by respective arm grooves 630 defined by the tote body 610 of the disk drive tote 600.

Referring again to FIG. 14, a tote mover 430 is disposed on the transfer station housing 410 and is configured to move a pivotally coupled tote loading support 440, which is configured to receive and support a disk drive tote 600. The tote loading support 440 pivots and moves between a first position and a second position. The tote mover 430 is configured to move the tote loading support 440 between the first position, for holding a disk drive tote 600 in a loading position (e.g. in a horizontal orientation at the loading support's first position), and the second position, for holding a disk drive tote 600 in the presentation position (e.g. in a substantially vertical orientation) at one of the tote presentation support systems 420 for servicing by the disk drive testing system 100 (e.g. by the robotic arm 200). In some examples, the tote presentation support system 420 holds the tote 600 at a slightly inclined (e.g. off vertical) orientation to keep disk drives 500 from accidentally slipping out of the tote 600.

A method of performing disk drive testing includes presenting multiple disk drives 500 to a disk drive testing system 100 for testing and actuating an automated transporter 200 (e.g. robotic arm) to retrieve one of the disk drives 500 from the disk drive tote 600 and deliver the retrieved disk drive 500 to a test slot 310 of a rack 300 of the disk drive testing system 100. The method includes actuating the automated transporter 200 to insert the disk drive 500 in the test slot 310, and performing a functionality test on the disk drive 500 received by the test slot 310. The method may also include actuating the automated transporter 200 to retrieve the tested disk drive 500 from the test slot 310 and deliver the tested disk drive 500 back to a destination location. In some implementations, the method includes retrieving multiple presented disk drives 500 and delivering each of the disk drives to a respective test slot 310. In other implementations, the method includes shuffling disk drives 500 amongst test slots 310 by actuating the automated transporter 200 to remove a first disk drive 500 from a first test slot 310 and carrying it with the first arm 720 of the manipulator 700, moving to a second test slot 310 and removing a second disk drive 500 and carrying it with the second arm 730 of the manipulator 700, and then inserting the first disk drive 500 into the second slot 310. The method may also include actuating the automated transporter 200 to move the second disk drive to the first test slot 310 and inserting the second disk drive 500 in the first test slot 310. For this mode of operation (disk drive shuffling), the dual-armed manipulator 700 provides distinct advantages over a single-armed manipulator by allowing direct exchanges of disk drives 500 at each stop, rather than having to take a disk drive 500 out of a first test slot 310, park the disk drive 500 in an empty slot 310 or in a tote 600, retrieve another disk drive 500 from a second slot 310 and insert that disk drive 500 into the first test slot 310, and then retrieve the parked disk drive 500 and insert it in the second slot 310. The dual-armed manipulator 700 removes the step of parking one of the disk drives 500 while swapping disk drives 500 amongst two test slots 310.

Presenting multiple disk drives 500 for testing may be achieved by loading multiple disk drives 500 into/onto a transfer station 400, as by loading the disk drives 500 into disk drive receptacles 620 defined by a disk drive tote 600, and loading the disk drive tote 600 into/onto the transfer station 400. A tote mover 430 of the transfer station 400 is actuated to move the disk drive tote 600 from a loading position to a presentation position for servicing by the disk drive testing system 100. The disk drive tote 600 is supported in the presentation position by one of multiple tote presentation support systems 420 disposed on the transfer station housing 410 and arranged vertically with respect to each other. Multiple disk drive totes 600, each housing disk drives 500, can be sequentially placed in the loading position on the transfer station 400 and moved by the tote mover 430 to its respective presentation position at one of the multiple tote presentation support systems 420 for servicing by the disk drive testing system 100.

In retrieving one or more of the presented disk drives 500 for testing, the method preferably includes actuating the automated transporter 200 to retrieve a disk drive transporter 550 (e.g. from a test slot 310 housed in a rack 300), and actuating the automated transporter 200 to retrieve one of the disk drives 500 from the transfer station 400 and carry the disk drive 500 in the disk drive transporter 550. The method includes actuating the automated transporter 200 to deliver the disk drive transporter 550 carrying the disk drive 500 to the test slot 310 for performing a functionality test on the disk drive 500 housed by the received disk drive transporter 550 and the test slot 310. In some examples, delivering the disk drive transporter 550 to the test slot 310 includes inserting the disk drive transporter 550 carrying the disk drive 500 into the test slot 310 in the rack 300, establishing an electric connection between the disk drive 500 and the rack 300. After testing is completed on the disk drive 500, the method includes actuating the automated transporter 200 to retrieve the disk drive transporter 550 carrying the tested disk drive 500 from the test slot 310 and delivering the tested disk drive 500 back to a destination location, such as a destination disk drive tote 600 on the transfer station 400. In some implementations, the rack 300 and two or more associated test slots 310 are configured to move disk drives 500 internally from one test slot 310 to another test slot 310, as in the case where the test slots 310 are provisioned for different kinds of tests.

In some examples, the method includes actuating the automated transporter 200 to deposit the disk drive transporter 550 in the test slot 310 after depositing the tested disk drive 500 at a destination location (e.g. in a disk drive receptacle 620 of a destination disk drive tote 600), or repeating the method by retrieving another disk drive 500 for testing (e.g. from the disk drive receptacle 620 of a source disk drive tote 600).

In some implementations, the automated transporter 200 includes the manipulator 700, discussed above, which allows the automated transporter 200 to retrieve, handle, and deliver multiple disk drives 500 and/or disk drive transporters 550. For example, the automated transporter 200 can retrieve and carry one untested disk drive 500 in a disk drive transporter 500 held by one arm 720, 730 of the manipulator 700, and deliver the untested disk drive 500 to a test slot 310. At the test slot 310, the automated transporter 200 removes a disk drive transporter 550 carrying a test disk drive 500 currently in the test slot 310, before inserting the disk drive transporter 550 carrying the untested disk drive 500 into the test slot 310 for testing. The automated transporter 200 then delivers the tested disk drive 500 to a destination location, such as a receptacle 620 of a destination disk drive tote 600. In another example, the automated transporter 200 can retrieve and carry two untested disk drives 500, one on each arm 720, 730 of the manipulator 700, and then deliver the two untested disk drives 500 to respective test slots 310 for testing. The automated transporter 700 can then be actuated to retrieve two tested disk drives 500 from their respective slots 310 (e.g. by engaging and removing their respective disk drive transporters 550 with the manipulator 700), and deliver the tested disk drives 500 to a destination location, such as two receptacles 620 of one or more destination disk drive totes 600. If one tested disk drive 500 passed the disk drive testing and the other failed, they may be placed in different destination disk drive totes 600, such a "passed" disk drive tote 600 and a "failed" disk drive tote 600.

The manipulator 700 allows the automated transporter 200 to move multiple disk drives 500 and/or disk drive transporters 550 within the disk drive testing system 100 to accomplish more tasks than previously achievable by a manipulator capable of only handling one disk drive 500 and/or disk drive transporter 550 at a time. The increased flexibility allows for path planning of the automated transporter 200 to optimize its movements.

A number of implementations have been described. Nevertheless, it will be understood that various modifications may be made without departing from the spirit and scope of the disclosure. Accordingly, other implementations are within the scope of the following claims.

What is claimed is:

1. A method of transferring disk drives within a disk drive system, the method comprising:
    performing one or more of first operations or second operations;
    wherein the first operations comprise:
        loading, into the disk drive system at a first location, the disk drives;
        actuating an automated transporter to retrieve a plurality of the disk drives;
        actuating the automated transporter to deliver a first disk drive from the plurality of the disk drives to a first disk drive slot in a second location;
        actuating the automated transporter to insert the first disk drive in the first disk drive slot; and
        unloading one or more of the disk drives from the disk drive system;
    wherein the second operations comprise:
        loading a disk drive tote into the disk drive system;
        actuating the automated transporter to retrieve a second disk drive from a second test slot of the disk drive system;
        actuating the automated transporter to deliver the second disk drive to the disk drive tote; and
        unloading, by the disk drive tote, the second disk drive from the disk drive system.

2. The method of claim 1, further comprising:
    actuating the automated transporter to retrieve multiple disk drive transporters;
    actuating the automated transporter to carry the first disk drive with a disk drive transporter from the multiple disk drive transporters; and
    actuating the automated transporter to deliver the disk drive transporter carrying the first disk drive to the first disk drive slot.

3. The method of claim 2, wherein insertion of the disk drive transporter into the first disk drive slot provides closure of the first disk drive slot.

4. The method of claim 2, further comprising:
    positioning the disk drive transporter below the first disk drive;
    lifting the first disk drive off a disk drive support of a disk drive tote; and
    carrying the first disk drive in the disk drive transporter away from the disk drive tote.

5. The method of claim 1, further comprising:
    presenting one or more disk drive totes to the disk drive system.

6. The method of claim 1, wherein the automated transporter comprises a manipulator configured to transport the disk drives.

7. The method of claim 6, wherein the manipulator comprises:
    a manipulator body; and
    first and second connectors disposed on the manipulator body and arranged in a substantially V-shaped configuration with respect to each other, with a connector being configured to releasably attach to a disk drive transporter.

8. The method of claim 1, further comprising:
    moving, at a substantially simultaneous time, at least two of the plurality of the disk drives to the second location that is remote from the first location.

9. The method of claim 1, further comprising:
placing the first disk drive in the first disk drive slot in a position in which a disk drive connector of the first disk drive is engaged with a disk drive slot connector of the first disk drive slot.

10. A method of transferring disk drives within a disk drive system, the method comprising:
receiving, into the disk drive system at a first location, one or more disk drive totes holding multiple disk drives, with the one or more disk drive totes configured for movement between a position outside of the disk drive system and a position that is accessible to an automated transporter in the disk drive system;
actuating the automated transporter having a manipulator to retrieve a first disk drive and a second disk drive from the one or more disk drive totes, the manipulator being configured to transport the multiple disk drives;
actuating the automated transporter to insert the first disk drive into a first disk drive slot of the disk drive system;
actuating the automated transporter to insert the second disk drive into a second disk drive slot of the disk drive system;
actuating the automated transporter to retrieve the first disk drive housed in the first disk drive slot
actuating the automated transporter to deliver the first disk drive to the second disk drive slot;
actuating the automated transporter to retrieve the second disk drive from the second disk drive slot while carrying the first disk drive; and
actuating the automated transporter to insert the first disk drive into the second disk drive slot while carrying the second disk drive.

11. The method of claim 10, further comprising:
actuating the automated transporter to deliver the second disk drive to the first disk drive slot; and
actuating the automated transporter to insert the second disk drive into the first disk drive slot.

12. The method of claim 10, wherein the manipulator comprises:
a manipulator body; and
first and second connectors disposed on the manipulator body and arranged in a substantially V-shaped configuration with respect to each other, a connector being configured to releasably attach to a disk drive transporter;
wherein the manipulator is configured to transport the first and second disk drives in corresponding releasably attached disk drive transporters.

13. The method of claim 10, wherein one or more of the disk drives are carried in a corresponding disk drive transporter, and wherein inserting a disk drive into one of the disk drive slots comprises inserting the corresponding disk drive transporter into the respective disk drive slot, engaging the carried disk drive with a respective connector of the disk drive system, the inserted disk drive transporter providing closure of its respective disk drive slot.

14. A disk drive system comprising:
an automated transporter;
at least one rack arranged about the automated transporter for access by the automated transporter;
multiple disk drive slots housed by a rack, a disk drive slot being configured to receive a disk drive;
a transfer station arranged for access by the automated transporter, the transfer station configured for presentation of disk drives; and
a manipulator attached to the automated transporter, the manipulator being configured to carry the disk drives;
wherein the disk drive system is configured to perform one or more of first operations or second operations;
wherein the first operations comprise:
loading, into the disk drive system at a first location, the disk drives;
actuating the automated transporter to retrieve a plurality of the disk drives;
actuating the automated transporter to deliver a first disk drive from the plurality of the disk drives to a first disk drive slot in a second location;
actuating the automated transporter to insert the first disk drive in the first disk drive slot; and
unloading one or more of the disk drives from the disk drive system;
wherein the second operations comprise:
loading a disk drive tote into the disk drive system;
actuating the automated transporter to retrieve a second disk drive from a second test slot of the disk drive system;
actuating the automated transporter to deliver the second disk drive to the disk drive tote; and
unloading, by the disk drive tote, the second disk drive from the disk drive system.

15. The disk drive system of claim 14, wherein the manipulator is configured to releasably attach to multiple disk drive transporters.

16. The disk drive system of claim 14, wherein the manipulator comprises:
a manipulator body; and
first and second connectors disposed on the manipulator body and arranged in a substantially V-shaped configuration with respect to each other, a connector being configured to releasably attach to a disk drive transporter.

17. The disk drive system of claim 14, wherein the transfer station comprises a transfer station housing configured to receive and to support one or more disk drive totes in a presentation position for servicing by the automated transporter, wherein a disk drive tote comprises a tote body defining multiple disk drive receptacles configured to each house a disk drive.

* * * * *